(12) United States Patent
Walkingshaw et al.

(10) Patent No.: US 12,401,195 B2
(45) Date of Patent: Aug. 26, 2025

(54) ARTIFICIAL INTELLIGENCE-BASED MANAGEMENT OF ENERGY STORAGE UNITS

(71) Applicant: Torus Inc., Sandy, UT (US)

(72) Inventors: Nathan Walkingshaw, Sandy, UT (US); David Duane Rackham, Lehi, UT (US); Dalya Adams, Baton Rouge, LA (US); Jackson Bennett, Washington, DC (US)

(73) Assignee: Torus Inc., South Salt Lake, UT (US)

( * ) Notice: Subject to any disclaimer, the term of this patent is extended or adjusted under 35 U.S.C. 154(b) by 0 days.

(21) Appl. No.: 18/622,673

(22) Filed: Mar. 29, 2024

(65) Prior Publication Data
US 2024/0332967 A1    Oct. 3, 2024

Related U.S. Application Data

(60) Provisional application No. 63/492,793, filed on Mar. 29, 2023.

(51) Int. Cl.
*H02J 3/00* (2006.01)
*G01W 1/10* (2006.01)

(52) U.S. Cl.
CPC .............. *H02J 3/003* (2020.01); *G01W 1/10* (2013.01); *H02J 2203/20* (2020.01)

(58) Field of Classification Search
CPC ..................................................... H02J 3/003
See application file for complete search history.

(56) References Cited

U.S. PATENT DOCUMENTS 6,175,178 B1    1/2001  Tupper et al.
11,130,422 B1 *  9/2021  Goldfarb .................. F03D 9/32
(Continued)

FOREIGN PATENT DOCUMENTS

JP       2007-056710 A     3/2007

OTHER PUBLICATIONS

Ertz, Gabriel, Development, manufacturing, and testing of a multi-rim {hybrid} flywheel rotor, Diploma Thesis University of Alberta, Institute For Dynamics and Vibration, Jun. 10, 2014, 107 pages.
(Continued)

*Primary Examiner* — Nathan L Laughlin
(74) *Attorney, Agent, or Firm* — VLP Law Group LLP; Michel Bohn

(57) ABSTRACT

An example system may include an energy storage unit and various processors configured to communicate with components of the energy storage unit. The example system may determine a consumption model that predicts a future consumption for a node based on local power consumption for the node. The system may receive weather forecast data for the node and determine a power production model for the node that predicts a future power production using the weather forecast data. The system may compute a predicted power differential using the consumption model, the production model, and a current context of the node. The system may perform automated operations using the predicted power differential, such as charging or discharging an energy storage unit or controlling one or more power loads.

20 Claims, 18 Drawing Sheets

(56) References Cited

U.S. PATENT DOCUMENTS

| | | |
|---|---|---|
| 2010/0115259 A1* | 5/2010 | Elsila ................ H04M 1/72448 |
| | | 709/217 |
| 2010/0301771 A1 | 12/2010 | Chemel et al. |
| 2012/0176074 A1 | 7/2012 | Dubois et al. |
| 2014/0039709 A1 | 2/2014 | Steven et al. |
| 2016/0079826 A1 | 3/2016 | Paiz et al. |
| 2016/0178031 A1 | 6/2016 | Pullen |
| 2018/0069399 A1 | 3/2018 | Capp et al. |
| 2019/0013669 A1 | 1/2019 | Davies et al. |
| 2020/0005208 A1 | 1/2020 | Fife |
| 2020/0126168 A1 | 4/2020 | Macklis et al. |
| 2020/0176986 A1 | 6/2020 | Addepalle et al. |
| 2020/0212762 A1 | 7/2020 | Dharan |
| 2020/0271097 A1 | 8/2020 | Burkle |
| 2021/0135489 A1 | 5/2021 | Stites-Clayton et al. |
| 2022/0123552 A1* | 4/2022 | Pathak .................... H02J 3/001 |
| 2022/0140610 A1* | 5/2022 | Bangalore ............... H02J 7/342 |
| | | 320/101 |
| 2024/0037008 A1* | 2/2024 | Lecuivre ............. G06F 11/3442 |
| 2024/0154414 A1* | 5/2024 | Wright ................... H02J 3/381 |
| 2024/0250321 A1* | 7/2024 | Mitsuyama ......... H01M 10/482 |

OTHER PUBLICATIONS

Ha, Sung K., et al., Design and Manufacture of a Composite Flywheel Press-Fit Multi-Rim Rotor, Journal of Reinforced Plastics and Composites, 27, Feb. 25, 2008, SAGE Publications, pp. 953-965.

Ha, Sung K., et al., Design and Spin Test of Hybrid Composite Flywheel Rotor with Split Type Hub, Journal of Composite Materials, Jan. 9, 2006, SAGE Publications, pp. 1-18.

International Search Report and Written Opinion of Intl. Application No. PCT/US2023/061515, mailed Jul. 19, 2023 (24pages).

International Search Report and Written Opinion of Intl. Application No. PCT/US2023/061784, mailed Jun. 5, 2023 (12pages).

Kim, Seong J., et al., Design and fabrication of hybrid composite hub for multi-rim flywheel energy storage system, Composite Structures 107, 2014, pp. 19-29.

International Preliminary Report on Patentability received for PCT Patent Application No. PCT/US23/61515, mailed on Aug. 8, 2024, 11 pages.

* cited by examiner

500a

700

Modes

INVERTER MODES

◉ Self Consume
Prioritize using the solar and battery power that you've produced before pulling from the grid.

○ Battery Priority
Charge your home battery as quickly as possible using all available Solar and pulling from the grid if necessary.

Storm Watch
When enabled your Torus Station will charge your battery to prepare for a potential weather related grid outage.

SCHEDULE

Auto Switch
Switch to Battery Priority everyday from 11am-2pm. We recommend enabling this setting during the winter season when solar production is low.

EV CHARGING

Figure 7

ARTIFICIAL INTELLIGENCE-BASED MANAGEMENT OF ENERGY STORAGE UNITS

BACKGROUND

The present disclosure relates to managing local energy storage units based on data specific to the local energy storage unit.

Commonly, excess or backup power, such as that produced by solar panels or wind turbines, is stored in chemical storage, such as large chemical batteries. More-recently, other local power storage solutions have included gravity or kinetic energy storage, such as flywheels. Unfortunately, because they are often local to residences, customers, especially larger scale utility organizations, have no optics into these systems, so they cannot be actively managed, let alone based on each battery's specific circumstances.

Furthermore, the use of renewable energy, especially stored in batteries is controlled reactively. For instance, when solar production is high and power consumption is low, a battery is charged until the remainder of the power production is dumped into a grid. Similarly, when solar production is low, the battery is discharged. Unfortunately, because these systems are reactive, they cannot anticipate future needs and may increase systemic issues on the electrical grid.

SUMMARY

In some aspects, the techniques described herein relate to a computer-implemented method including: receiving, by one or more processors, power consumption data for one or more nodes, the one or more nodes including one or more meters for determining a set of power consumption data, each of the one or more nodes including an energy storage unit, the energy storage unit including one or more of a mechanical battery and a chemical battery; determining, by the one or more processors, a subset of the set of power consumption data omitting one or more controllable loads from which the set of power consumption data is determined; training, by the one or more processors, a first machine learning model to predict a future power consumption based on the subset of the set of power consumption data; receiving, by the one or more processors, context data for the one or more nodes, the context data including local weather data and weather forecast data for the one or more nodes; receiving, by the one or more processors, local power production data for the one or more nodes, the local power production data being determined for one or more solar panels electrically coupled with the energy storage unit; training, by the one or more processors, a second machine learning model using the local power production data and the local weather data; computing, by the one or more processors, a predicted power differential at a future time for the one or more nodes based on the weather forecast data, the first machine learning model, and the second machine learning model; controlling, by the one or more processors, a mode of the one or more nodes based on the predicted power differential at the future time, the mode defining whether the one or more nodes perform one or more of receiving, storing, or outputting electrical power; and directing, by the one or more processors, power consumption of the one or more controllable loads of the one or more nodes based on the predicted power differential at the future time.

In some aspects, the techniques described herein relate to a computer-implemented method including: determining, by one or more processors, a consumption model for a node, the consumption model predicting a future power consumption for the node; receiving, by the one or more processors, context data for the node, the context data including weather forecast data for the node; determining, by the one or more processors, a production model for the node, the production model predicting a future power production of the node using the weather forecast data for the node; computing, by the one or more processors, a predicted power differential at a future time for the node based on the predicted power consumption, the predicted power production, and the context data for the node; and performing, by the one or more processors, one or more automated operations using the predicted power differential.

In some aspects, the techniques described herein relate to a computer-implemented method, wherein: the consumption model for the node includes a first machine learning model trained on power consumption data of one or more loads electrically coupled with an energy storage unit of the node.

In some aspects, the techniques described herein relate to a computer-implemented method, further including: receiving, by the one or more processors, power consumption data for the node, the node including one or more meters for determining a set of power consumption data; determining, by the one or more processors, a baseline power consumption for the node using a subset of the set of power consumption data; and training, by the one or more processors, a first machine learning model to predict the future power consumption based on the subset of the set of power consumption data.

In some aspects, the techniques described herein relate to a computer-implemented method, wherein: the subset of the power consumption data omitting one or more controllable loads from which the set of power consumption data is determined.

In some aspects, the techniques described herein relate to a computer-implemented method, wherein: the context data includes local weather data received from a local power station to the node, the local weather data informing one or more of the consumption model and the production model for the node.

In some aspects, the techniques described herein relate to a computer-implemented method, further including: receiving, by the one or more processors, local power production data for the node; and training, by the one or more processors, a second machine learning model using the local power production data and the local weather data, the production model including the second machine learning model.

In some aspects, the techniques described herein relate to a computer-implemented method, wherein: the production model includes a second machine learning model trained using power production and context data for one or more second nodes, the one or more second nodes having one or more attributes in common with the node.

In some aspects, the techniques described herein relate to a computer-implemented method, further including: aggregating, by the one or more processors, predicted power differentials for a plurality of nodes, the predicted power differentials including the computed power differential for the node; generating, by the one or more processors, one or more analytics based on the predicted power differentials for the plurality of nodes; and providing, by the one or more processors, one or more graphical user interfaces graphically showing the one or more analytics.

In some aspects, the techniques described herein relate to a computer-implemented method, wherein performing the one or more automated operations using the predicted power differential includes: controlling, by the one or more processors, a mode of the node based on the predicted power differential at the future time, the mode defining whether the node performs one or more of receiving, storing, or outputting electrical power.

In some aspects, the techniques described herein relate to a computer-implemented method, wherein performing the one or more automated operations using the predicted power differential includes: directing, by the one or more processors, power consumption of one or more controllable loads of the node based on the predicted power differential.

In some aspects, the techniques described herein relate to a system including: an energy-storage unit including: a battery storing energy mechanically or chemically; an inverter coupled with the battery and converting direct current from the battery to alternating current; and a controller communicatively coupled with the inverter, the controller controlling one or more functions of the battery; and one or more processors executing instructions that cause the one or more processors to perform operations including: determining a consumption model for a node, the consumption model predicting a future power consumption for the node; receiving context data for the node, the context data including weather forecast data for the node; determining a production model for the node, the production model predicting a future power production of the node using the weather forecast data for the node; computing a predicted power differential at a future time for the node based on the predicted power consumption, the predicted power production, and the context data for the node; and performing one or more automated operations using the predicted power differential.

In some aspects, the techniques described herein relate to a system, wherein: the consumption model for the node includes a first machine learning model trained on power consumption data of one or more loads electrically coupled with an energy storage unit of the node.

In some aspects, the techniques described herein relate to a system, wherein the operations further include: receiving power consumption data for the node, the node including one or more meters for determining a set of power consumption data; determining a baseline power consumption for the node using a subset of the set of power consumption data; and training a first machine learning model to predict the future power consumption based on the subset of the set of power consumption data.

In some aspects, the techniques described herein relate to a system, wherein: the subset of the power consumption data omitting one or more controllable loads from which the set of power consumption data is determined.

In some aspects, the techniques described herein relate to a system, wherein: the context data includes local weather data received from a local power station to the node, the local weather data informing one or more of the consumption model and the production model for the node.

In some aspects, the techniques described herein relate to a system, wherein the operations further include: receiving local power production data for the node; and training a second machine learning model using the local power production data and the local weather data, the production model including the second machine learning model.

In some aspects, the techniques described herein relate to a system, wherein the operations further include: aggregating predicted power differentials for a plurality of nodes, the predicted power differentials including the computed power differential for the node; generating one or more analytics based on the predicted power differentials for the plurality of nodes; and providing one or more graphical user interfaces graphically showing the one or more analytics.

In some aspects, the techniques described herein relate to a system, wherein performing the one or more automated operations using the predicted power differential includes: controlling a mode of the node based on the predicted power differential at the future time, the mode defining whether the node performs one or more of receiving, storing, or outputting electrical power.

In some aspects, the techniques described herein relate to a system, wherein performing the one or more automated operations using the predicted power differential includes: directing power consumption of one or more controllable loads of the node based on the predicted power differential.

Other implementations of one or more of these aspects or other aspects include corresponding systems, apparatus, and computer programs, configured to perform the various actions and/or store various data described in association with these aspects. These and other implementations, such as various data structures, are encoded on tangible computer storage devices. Numerous additional features may, in some cases, be included in these and various other implementations, as discussed throughout this disclosure. It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

FIG. 7 illustrates an example mobile graphical user interface showing modes of a node.

DETAILED DESCRIPTION

Figure 1:
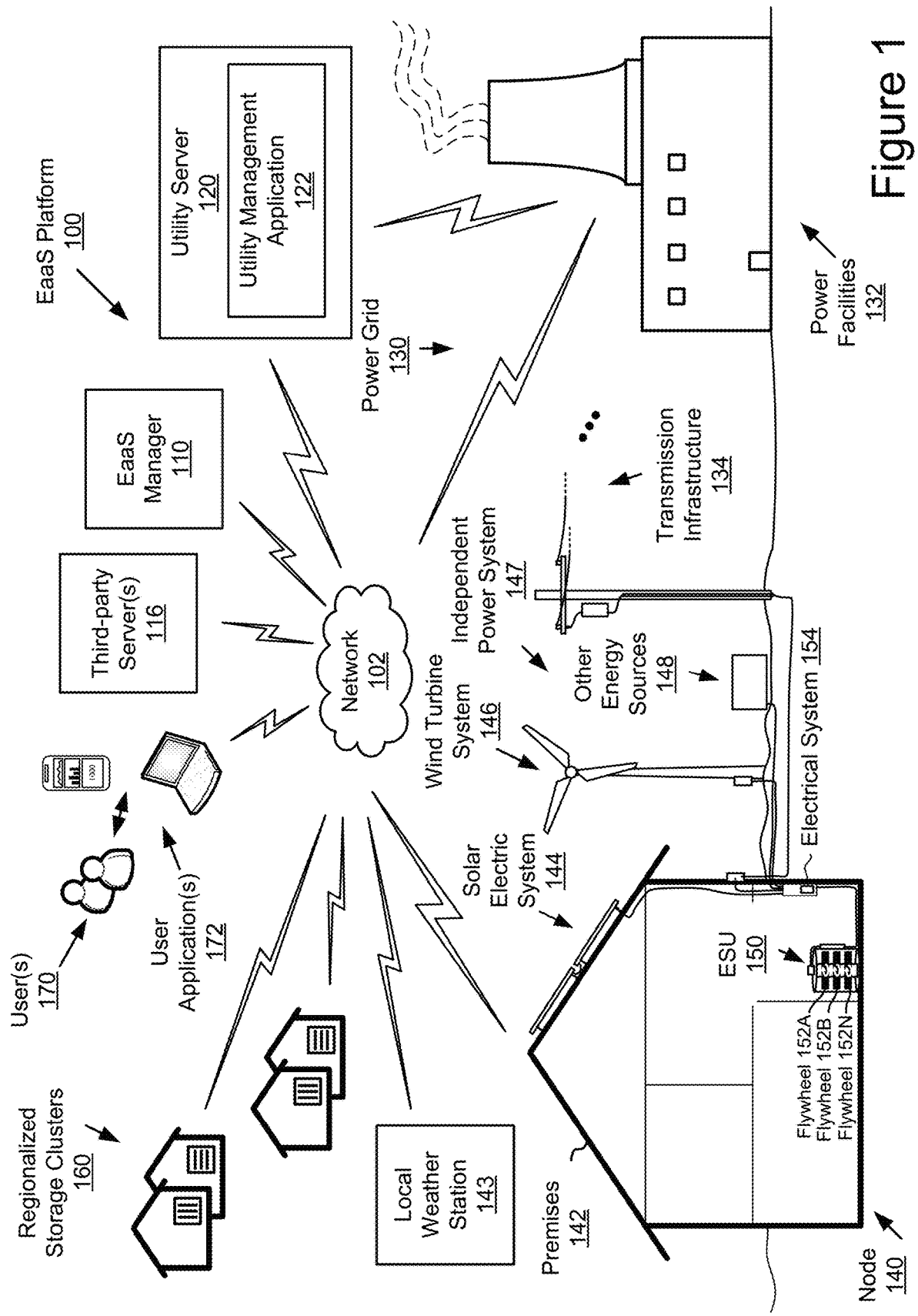
FIG. 1 illustrates a block diagram of an energy as a service platform.

This description includes several improvements over previous solutions, such as those described in reference to the Background. Systems and methods for managing energy storage units and other devices using artificial intelligence, for example, on a local device level while allowing system-wide control and analytics.

In some implementations, one, two, or more energy storage units (ESUs) may be installed at a residence to provide backup power in case of a power outage, to store electricity generated using residential solar panels, or to offset unevenness of power production and usage (e.g., electrical storage at a residence may be controlled to address the unevenness at the residence, nearby residences, or across the power grid). An ESU may include one or more mechanical or chemical batteries, for instance. An energy storage unit may be buried next to an electrical panel or placed in a shed outside a residence, placed in a garage or utility room, or stored offsite.

In some implementations, multiple energy storage units may be coupled together to scale energy backup at a larger facility, such as a business, or by an electrical utility. For instance, many energy storage units may be placed at a facility, whether buried or above ground for use by the facility or by an electrical utility provider. The multiple energy storage units may include or be coupled to an ESU controller or control unit that may be communicatively linked to each other or to a central server to control storage and distribution of the stored energy (e.g., by controlling the rotational frequency of a flywheel to keep various flywheels at efficient speeds).

In some implementations, the ESU may be based on a flywheel, chemical battery, supercapacitor, etc., as described in further detail in reference to the figures herein.

The technologies described herein use local data to predict local power production and consumption over time, which data may be used to control the consumption, production, or storage of energy, for example, at a local mechanical or chemical battery. For instance, local forecast of data consumption and production can be used to set a mode of an energy storage unit, thereby allowing a target state of charge to be achieved at a future point of time to satisfy future needs, such as energy backup during a storm. These features may also be used to balance power over a power grid and over time.

In some implementations, the models and features described herein provide AI-powered integrations with various home devices, such as an EV, smart thermostat, or appliances. Using integrations, the technology may generate an energy usage forecast and/or schedule usage times for these devices.

The technology may also determine a power production forecast for a specific location based on a weather location specific to that location as well as that locations power production (e.g., due to solar). Based on the predicted power consumption and predicted power production, the technology may control the local power production, consumption, or storage equipment to achieve objectives, such as maintaining a target state of charge of a battery at a future point or balancing power across an electrical grid.

The technology helps balance the load in the virtual power plant to optimize energy production and consumption. The machine learning algorithms can take into account factors such as energy demand, solar production, and the availability of energy storage. This can help ensure that energy is delivered when and where it is needed most and avoid overloading the system. Accordingly, the technology can be used to improve grid stability in the virtual power plant configuration. The machine learning algorithms can analyze data on energy supply and demand and adjust the power output of the ESU or flywheel and solar panels to maintain a stable grid frequency. This can help prevent power outages and other disruptions to the energy supply.

In some implementations, the technology may use these predictions and modes to help the virtual power plant (e.g., consisting of a plurality of nodes 140 or energy storage units) dynamically adjust energy prices based on energy demand and supply. Machine learning algorithms can analyze real-time data on energy usage and production to determine the most optimal pricing strategy. This can help balance the demand and supply of energy, ensuring that energy is used efficiently. Accordingly, the technology can be used to automate energy trading in the virtual power plant. Machine learning algorithms can analyze real-time market data and make predictions about energy prices. This can help the system maximize cost-effectiveness by buying energy when prices are low and selling it when prices are high.

The technology takes the predictions for weather and energy and allows individual users or electrical utility providers to command and control one or more nodes 140 (e.g., energy production and storage devices) at a residence or virtual power plant to behave differently. For instance, the technology may shift battery mode priority to self-consume to shave a peak energy production by a communicatively-linked solar array. Similarly, a modality may be changed based on forecasted inclement weather or another future energy need. Accordingly, one or many (e.g., hundreds or thousands) of local devices can be controlled to store energy, back feed power into a grid, or perform other operations.

The technology described herein can provide monitoring, analysis, troubleshooting, and/or alerting on a local, individual (e.g., a single ESU or flywheel) level and/or end to end across single, multiple, clusters, or an entire network or energy ecosystem of energy storage units. The technology may provide second-by-second monitoring and alerting in which faults are categorized and automatically addressed where possible, tiered by severity (e.g., alpha, bravo, charlie, delta, echo, etc.). Where the technology determines that a fault requires action that cannot be automatedly addressed locally, it may automatically digitally trigger, using firmware on a local device (e.g., by firmware operating on a controller of an ESU) a human or other external response, which trigger message may include triage/severity information. As faults can be automatically identified, response time is shortened, uptime is improved, and safety is increased.

The technology allows rapid, continuous monitoring of local hardware (e.g., a flywheel or battery), which may be addressed, analyzed, and/or categorized on an individual level and/or across multiple devices. For instance, the system and method may determine the generation, use, and storage of each ESU (e.g., at a specific house or premises) or cluster of ESUs (e.g., a group of flywheels at one or more locations), potentially down to the circuit level. This may be performed using the technologies described in further detail below.

As data is sampled from various sources and/or sensors at a device, the controller or other computing device may perform operations described below to perform operations locally at an ESU or escalate it, as determined. Alert messages generated by the local system may be processed on the cloud either independently or in conjunction with the local device (e.g., the ESU), as described below.

For example, a flywheel or chemical battery power storage system may have various devices and sensors that generate data or identify faults either independently or as combinations.

Due to the local and remote processing, as well as the other features described herein, the architecture is highly scalable to grow organically, for instance, as additional devices are added to a location or cluster, or as a provider monitors increasing quantities of devices. Accordingly, the provider can gain insight into local devices and circuits in ways that were not previously possible. Individual residences can be monitored (e.g., by a customer or a provider), clusters of residences, subdivisions, etc., can be monitored either locally, at a subdivision/cluster level, or by a utility or provider.

It should be noted that while certain features are summarized here, and in the figures, other features are possible and contemplated herein.

With reference to the figures, reference numbers may be used to refer to components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components.

The innovative energy technology disclosed in this document provides novel advantages including the ability to integrate modern technology with conventional power infrastructure; enable rapid transition to renewable energy sources; provide backup to the power grid, use the power grid as a backup; store power locally in nodes 140 and regionalized storage clusters of nodes 140; isolate and minimize the impact of power outages; whether caused by natural disasters, infrastructure failure, or other factors; provide affordable alternatives to expensive and environmentally unfriendly electrochemical batteries; provide consumers the option to be independent from carbon-based power sources; and decentralize electric power production.

The innovative energy technology disclosed in this document provides novel advantages including the ability to integrate modern technology with conventional power infrastructure; enable rapid transition to renewable energy sources; use the power grid 130 as a backup; store power locally in nodes 140 and regionalized storage clusters 160 of node(s) 140; isolate and minimize the impact of power outages; whether caused by natural disasters, infrastructure failure, or other factors; provide affordable alternatives to expensive and environmentally unfriendly electrochemical batteries; provide consumers the option to be independent from carbon-based power sources; and decentralize electric power production.

As depicted in FIG. 1, the innovative energy technology described herein may comprise an energy as a service platform (EaaS platform) 100. The EaaS platform 100 may include an EaaS manager 110, third-party server(s) 116, user application(s) 172 operable on computing devices accessible to and interactable by user(s) 170 of the EaaS platform 100 and configured to send or receive data to the EaaS manager 110, regionalized storage clusters 160 comprised of one or more nodes 140, and the power grid 130 that comprises one or more power facilities 132 that are connected to a power transmission infrastructure 134.

A node 140 may be comprised of a power consuming entity and at least one ESU (e.g., an ESU 150 is provided as an example). A node 140 may be an entity that either consumers power itself or is coupled to entities that consumer power. In FIG. 1, a node 140 is depicted as a premises 142, such as a residential home, but it should be understood that any entity that consumes power is applicable, such as one or more appliances, a commercial structure such as a warehouse or office building, an electronic device or system (whether configured to move or static), a transportation system and/or vehicle, a transportation charging system, a power supply, a power substation, a power substation backup, etc. A regionalized storage cluster includes two or more nodes 140 in a given geographical region. A storage cluster may provide power banking functionality, as discussed further herein. The elements of the node 140 including the ESU(s) 150, the independent power system 147, the power grid 130, and/or any appliances and/or other entities, may be electrically coupled via an electrical system 154 including wiring, junctions, switches, plugs, breakers, transformers, inverters, controllers, and any other suitable electrical componentry.

In the depicted example, a node 140 is equipped with or coupled to power generating technology, such as an independent power system 147 and/or the power grid 130. The independent power system 147 may comprise power generating technology that is localized and that allows for independent power generation, such as renewable power generating technology. Non-limiting examples include a solar electric system 144 (comprising a solar array, controllers, inverters, etc.), a wind turbine system 146 (comprising turbine(s), controllers, inverters, etc.), and/or other energy sources 148, such as hydropower, geothermal, nuclear, systems and their constituent components, etc. The power generating technology may additionally or alternatively be conventional carbon-based power generating technology such as the depicted power grid 130, although for carbon negative or neutral implementation, a greener power generating technology may be preferred.

The node 140 may include or be coupled to an energy storage unit that is capable of storing excess power that is produced by the power generating technology. In some implementations, the energy storage unit may comprise an energy storage unit (ESU) 150. Although the ESU 150 is illustrated and described herein as including one or more flywheels 152A, 152B 152N (also simply referred to individually or collectively as 152), they may alternatively or additionally include chemical batteries, capacitors, or other energy storage devices. The ESU's 150 may convert the electricity received from the power generating technology to kinetic energy by spinning up (increasing the spin rate) of the flywheels 152 and/or by using one or more inverters that convert between direct current and alternating current, depending on the implementation.

Each battery or flywheel 152 or may be configured to store up to a certain maximum amount of energy. By way of non-limiting example, a motor 310 coupled to the flywheel 152 may be configured to spin the flywheel 152 up to between 15,000 rotations per minute (RPM) and 25,000 RPM, such that the flywheel 152 may store between 18 kilowatt hours (kWh) and 28 kWh of electricity. Combined, three stacked flywheels 152 could store between 54 kWh and 84 kWh of power. During hours in which the power generation technology, such as the solar cells, produce less power than what is consumed by the electrical apparatuses (e.g., appliances) of the premises 142, the motor 310 may be operated as a generator that converts the kinetic (mechanical) energy stored in the flywheel 152 to electricity, thereby pulling power from the flywheel 152 to meet the local power needs of the node 140 (e.g., power the electrical apparatuses of the premises 142). In this example, advantageously the node 140 may use an average of 15 kWh of power daily and the ESU 150 is capable of powering the node 140 fully for about 4-6 days should the local power generating cease to produce any power.

In some implementations, a premises 142 or node 140 may include or be coupled (physically or communicatively) with a local weather station 143 that measures light, precipitation, wind speed and direction, barometric pressure, or other weather data. For instance, where the premises 142 includes a residence, a local weather station 143 may be placed on a roof or in a yard of the residence. The local weather station 143 may be communicatively coupled directly with a controller 254 or central nervous system of a node 140 or ESU 150 or may be coupled with an EaaS manager 110, third-party server(s) 116, or another device via the network 102, for instance. Accordingly, weather and other context data may be used, as described below, to train one or more machine-learning models that predict power consumption and/or production. The weather data may also be input into a trained model in order to predict future behavior (e.g. power consumption or production), as described elsewhere herein.

In another example, as discussed further elsewhere herein, a utility may be integrated with the EaaS manager 110 and its utility management application 122 signal the power management application 111 via the storage cluster APIs 112 that it is experiencing a surge in demand for power, and the power management application 111 may signal a node 140 or cluster of nodes 140 (e.g., storage cluster 160) to spin off power from the flywheels 152 and provide the energy back to the grid through the transmission infrastructure 134, which may be connected to the node(s) 140 through connection points (e.g., two or three phase electrical service drops or buried power lines connected to a service panel, which typically includes power meter(s)). Conversely, the utility may be producing excess power and may wish to bank/store the power. The utility management application 122 may signal the power management application 111 via the storage cluster APIs 112 that it needs to store a given amount of power, and the power management application 111 may in turn signal a node 140 or cluster(s) of node(s) 140, such as one or more regionalized storage clusters 160 to inform them of the storage need, and node(s) 140 in those storage cluster(s) 160 that have excess capacity and are configured to receive power from the grid may receive the power through the transmission infrastructure 134 and store it as mechanical energy in the ESUs for later retrieval. The EaaS platform 100 may charge the utility for the power banking service, as discussed further elsewhere herein.

It should be understood that the RPMs and kWh figures provided in the prior paragraph are meant as non-limiting examples and that the ESU's 150 may be configured with flywheels 152 that are capable of storing more or less power depending on the implementation. For example, the weight of the flywheels 152, the materials used for the flywheels 152, the size and configuration of the flywheels 152, the efficiency of the motor 310 and bearings, and so forth, may all be adjusted based on the use case to provide a desired about of back-up power for the node 140. By way of further example, a flywheel 152 may be made of steel, aluminum, carbon fiber, titanium, any suitable alloy, and/or any other material that is capable of handling the cycles, vibration, radial and sheer stress and strain, and other conditions to which such a flywheel 152 would be subjected.

The power transmission infrastructure 134 comprises a power network that couples power-consuming entities, such as homes, offices, appliances, etc., to power facilities that generate power from carbon, nuclear, and/or natural sources. The transmission infrastructure 134 may include intervening elements, such as step-up transformers, substations, transmission lines, and so forth, which are interconnected to provide power widely to different geographical regions.

A power utility (also simply referred to as a utility), which may own and operate one or more power facilities and portions of the transmission infrastructure 134, may operate a utility server configured to execute a utility management application 122. The utility management application 122 may perform various functions such as load balancing, load managing, and grid energy storage, to manage the supply of electricity based on real-time demand. However, given the limitations of existing grid technologies, power outages, brownouts, and expensive peak power costs are still the norm.

A user may use an instance of a user application 172 executing on a computing device, such as the user's mobile phone or personal computer, to configure and interact with the ESU(s) 150 that they are authorized to control, such as a ESU 150 installed at their home or business, as discussed further elsewhere herein.

As shown in FIG. 1, the EaaS manager 110, the utility server 120, the power facilities 132, elements of the power grid 130, the wind turbine system 146, the solar electric system 144, the other sources 148, the node(s) 140, the regionalized storage clusters 160, the user applications 172 and associated computing devices, etc., may be coupled for communication and connected to the network 102 via wireless or wired connections (using network interfaces associated with the computing devices of the foregoing elements). The network 102 may include any number of networks and/or network types. For example, the network 102 may include one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The EaaS manager 110, the third-party server(s), the utility server 120, the node(s) 140, the power facilities, and the user devices may have computer processors, memory, and other elements providing them with non-transitory data processing, storing, and communication capabilities. For example, each of the foregoing elements may include one or more hardware servers, server arrays, storage devices, network interfaces, and/or other computing elements, etc. In some implementations, one or more of the foregoing elements may include one or more virtual servers, which operate in a host server environment. Other variations are also possible and contemplated.

Figure 2:
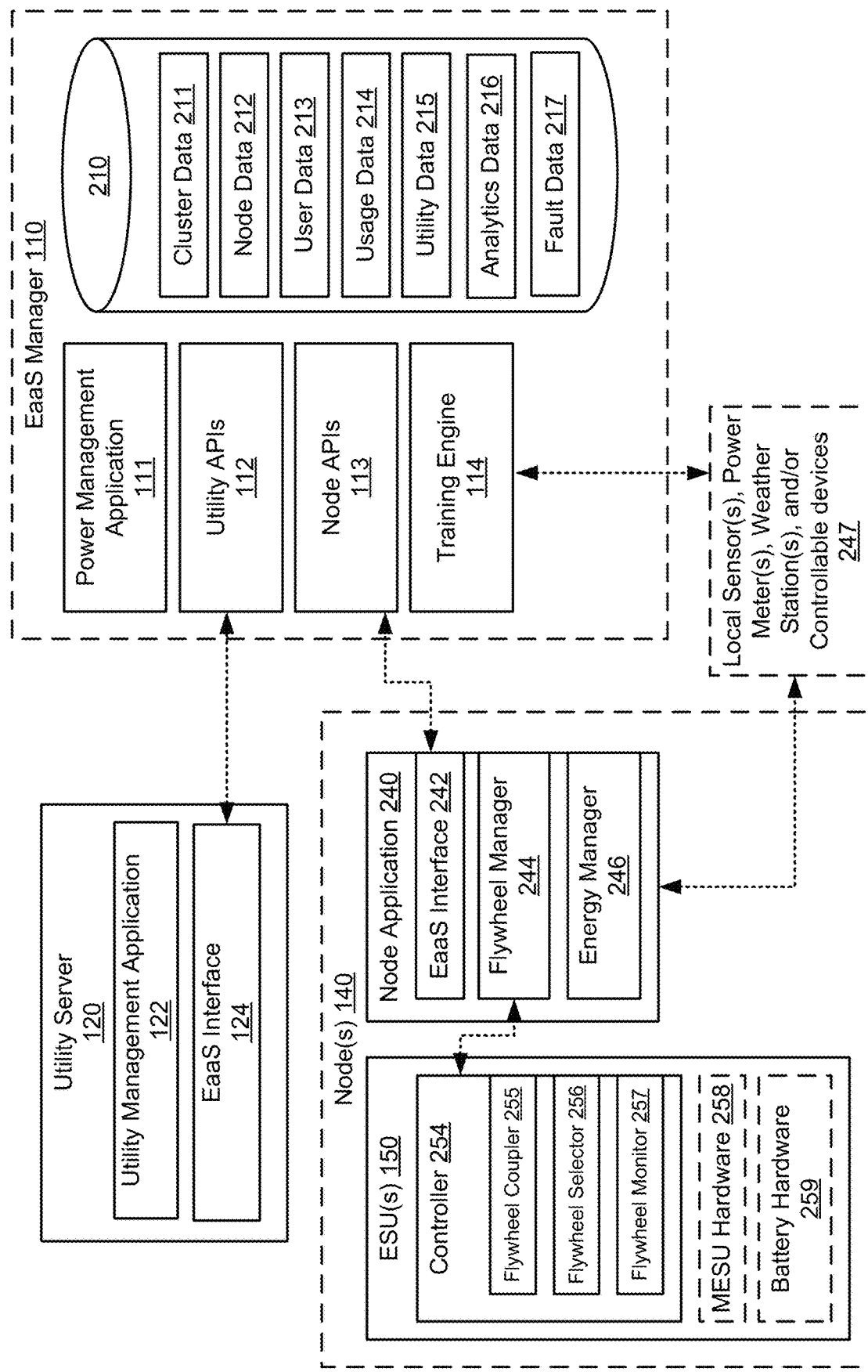
FIG. 2 illustrates a block diagram showing example components of, and the interaction between, a utility server, node(s), and an EaaS manager.

It should be understood that the EaaS platform 100 illustrated in FIG. 1 and the diagram illustrated in FIG. 2 are representative of example systems and that a variety of different system environments and configurations are contemplated and are within the scope of the present disclosure. For example, various acts and/or functionality may be moved between entities (e.g., from a server to a client, or vice versa, between servers, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc., without departing from the scope of this disclosure.

The third-party server(s) 116 one or more servers or services that provide additional or outside information. For example, a third-party server 116 may associated with and/or provide interaction with the National Weather Service™, an electric vehicle, a smart EV charger, a smart thermostat, a home automation system, a smart power meter (e.g., an Acrel™ meter), a solar power production service, or various other servers or services. For instance, the EaaS manager 110 and/or a node 140 (e.g., a controller 254 or central nervous system thereof) may communicate with one or more third-party servers 116 to receive power consumption data, power production data, contextual data, or otherwise. In some instances, the one or more third-party servers 116 may additionally or alternatively allow control of various power production devices or power loads.

FIG. 2 depicts a block diagram showing example components of, and the interaction between, the utility server 120, the node(s) 140, and the EaaS manager 110. The utility server includes an instance of the utility management application 122 and an EaaS interface 124. The EaaS manager 110 includes a power management application 111, utility APIs 112, node 140 APIs 113, and a data store 210. The data store 210 may store and provide access to data related to the EaaS platform 100, such as cluster data 211, node 140 data 212, user data 213, usage data 214, utility data 214, analytics data 216, and fault data 217.

In some implementations, the EaaS manager 110 may include a training engine 114 that receives various data and trains one or more machine-learning models that may be used by a node 140, EaaS manager 110, or utility server 120 to estimate future behavior, such as consumption or production of power, as described in further detail below. It should also be noted that, although the training engine 114 is illustrated as being included on the EaaS manager 110, it may be executed on a node 140, utility server 120, third-party server 116, another device, or distributed among multiple devices.

A node 140 of the EaaS platform 100 may include one or more ESU(s) 150, although chemical or other forms of electrical storage are possible and contemplated herein. An ESU 150 may include an instance of a controller 254. The controller 254 may include a flywheel coupler 255, a flywheel selector 256, and flywheel monitor 257. The MESU (mechanical energy storage unit) hardware 258 may comprise a chassis, one or more flywheels 152, magnets and/or bearings, a flywheel coupler 255, and/or a motor-generator 310. The motor-generator 310 may be coupled to each flywheel 152 via a flywheel coupler 255. The flywheel coupler 255 may engage and disengage the motor-generator 310 from the flywheel 152, such that each flywheel 152 may spin freely when disengaged and may be coupled to the motor-generator 310 when engaged such that the motor-generator 310 may increase the speed of the flywheel 152 (spin up the flywheel 152), or the flywheel 152 may spin the generator to produce power. Each flywheel 152 may be levitated using magnets to minimize the friction caused by the rotation of flywheel 152. As an example, a maglev unit may be used to suspend and retain the flywheel 152 while spinning.

In some implementations, the ESU 150 may additionally or alternatively include battery hardware 259, for example, for various other energy storage unit types, such as a chemical battery. For instance, one or more chemical battery cells, controllers, housings, or other configurations may be used.

Additionally, or alternatively, bearings, such as but not limited to ceramic bearings, may be used to support and retain the flywheel 152 while spinning. The chassis may house and support the flywheels 152. flywheels 152 may be arranged horizontally or vertically. In horizontal orientation, flywheels 152 may have a wheel-like shape and may be stackable one on another in the same chassis, but still configured to spin independently of one another. In such a configuration, the coupler couple to each flywheel 152 independently, or more than one coupler and motor 310 may be used, depending on the implementation. In a vertical orientation, the flywheels 152 may have a roll like shape, and may be positioned parallel to one another in the chassis. In either orientation, in some implementations, the chassis may include a housing that encloses the ESU 150 and provides a vacuum environment in which the components of the ESU 150 may operate. This is advantageous as it may seal out dirt, debris, and corrosion causing elements, and allow for the flywheels 152 and other components to optimally operate.

In some implementations, a node 140 may include one or more ESU(s) 150 and may act as a manager of the ESU(s), may receive and process information from the EaaS manager 110 for the two or more ESU(s) 150, and may send signals to the ESU(s) 150 (e.g., via the controller 254, MESU hardware 258, and/or battery hardware 259) and receive and process signals from the ESU(s) 150 (e.g., via the controller 254, MESU hardware 258, and/or battery hardware 259), to control the functionality and operations of the ESU(s) 150. In some further implementations, the structure, acts, and/or functionality of the controller 254 and the node 140 application 240 and their constituent components may be combined, and the node 140 may represent an ESU(s) 150 itself, to which one or more appliances that consume power may be coupled to receive power. Other variations are also possible and contemplated.

The utility management application 122, the controller 254, the node 140 application, the node 140 management application, the utility APIs, the node 140 APIs, and the ESU APIs may each include hardware and/or software executable to provide the acts and functionality disclosed herein.

Specifically, the utility management application 122 may be executable by the utility server to monitor power generation and distribution by one or more power facilities and a transmission infrastructure 134. The utility management application 122 may receive signals from various entities of the EaaS platform, such as the EaaS manager 110, the nodes 140, the transmission infrastructure 134, other utility management applications associated with other providers, and so forth. The utility management application 122 may communicate via the EaaS interface 124 with the EaaS manager 110 to access the services provided by the EaaS manager 110. In particular, the EaaS interface 124 may interact with the utility APIs of the EaaS manager 110 to request power banking, request the provision of supplemental power, to provide usage, performance, and/or demand data, and so forth. In some implementations, the EaaS interface 124 may generate and transmit a secure request via the network to the utility APIs. The power management application 111 may receive the request via the utility APIs and process it accordingly.

In some implementations, a node 140 or premises 142 may include one or more local sensors, power meters, weather stations, and/or controllable devices, which, for example, may be electrically and/or communicatively coupled with the ESU 150 or other components of the node 140. For instance, these sensors and devices may communicate directly with the controller 254 or with an EaaS manager 110 (directly or via one or more servers, networks, APIs, etc.). Accordingly, the training engine 114 may receive data from the devices 247 or other components of the node 140 (and/or other sources, such as third-party server(s) 116) to train models, as described below. The training engine 114 may store the models in the node 140 data 212, for example, if they are trained for a specific node 140, cluster data 211 if they were trained for a cluster of nodes 140, etc. Accordingly, the power management application 111 may receive or access the models to generate predictions, as described below, for example.

The power management application 111 may be coupled to the data store 210 to store and retrieve data. The data stored by the data store 210 may be organized and queried using any type of data stored in the data store (e.g., cluster ID, user ID, utility ID, node 140 ID, ESU ID, configuration data, etc.). The data store 210 may include file systems, databases, data tables, documents, or other organized collections of data.

Cluster data 211 may comprise information about a cluster of two or more nodes 140 (e.g., regionalized storage cluster), such as the identity of the node(s) 140, the storage capacity of the storage cluster 160, the availability of the storage cluster 160, the operational health of the storage cluster 160 and/or constituent ESU(s) 150, the historical performance of the storage cluster 160, etc.). The cluster data 211 may include various consumption data, production data, weather data, context data, algorithms, equations, cluster attributes, machine learning models trained for the cluster, or other data.

Node 140 data 212 may comprise information about a node 140, such as the number of ESUs installed at the node 140, the type of node 140, the operational health of the ESU(s) 150, any restrictions or operation parameters of the ESU(s) 150, configuration data for the ESU(s) 150, identifiers of the ESU(s) 150, who the ESU(s) 150 belong to, whether the ESU(s) 150 can be used for banking grid power, whether the ESU(s) 150 have been inactivated, and so forth.

The node 140 data 212 may include various consumption data, production data, weather data, context data, algorithms, equations, node 140 attributes, machine learning models trained for the node 140, or other data, for example, as described in further detail elsewhere herein.

User data 213 may comprise information about the user associated with a storage cluster 160, node 140 or ESU 150, including user account information, login information, user preferences governing the ESUs (e.g., schedule data, activation/inactivation data, etc.).

Usage data 214 may comprise information about the usage of the clusters and/or ESU(s) 150, such as spin rates of the flywheels 152, power output levels, maintenance periods, downtime, inactive periods, third-party use (e.g., use by utilities or neighboring nodes 140), etc.

Utility data 215 may comprise information about utilities that have partnered with the EaaS platform 100, such as utility account information, utility capability information, power banking requirements, contractual parameters, performance requirements, power grid 130 specifications, etc.

Analytics data 216 may comprise insights about the EaaS platform 100, such as local vs. grid power generation, aggregate usage data, aggregate performance data, etc. It should be understood that any other data that would be suitable and applicable to the EaaS platform 100 may be stored and processed by the EaaS manager 110. In some instances, the analytics data 216 may describe performance of machine learning models, predictions, or other data, as described in further detail elsewhere herein.

Fault data 217 may comprise sensor and other data, such as is described throughout this disclosure, including faults, alerts, thresholds against which data is compared to detect faults, and other data. For instance, fault data 217 may include any of the data described below in reference to the methods and graphical user interfaces, such as sensor data, voltages, state of charge, etc.

The node 140 application 240 and the controller 254 may communicate with the EaaS manager 110 via the EaaS interface 242, which is configured to interact with the node 140 APIs 113 surfaced by the EaaS manager 110. The node 140 APIs 113 provide methods for accessing data relevant to the node 140 and the ESU(s) 150 associated with the node 140, and executing various functionality, such as signaling unavailability/availability for banking power, requesting a functional upgrade, such as a higher spin rate for one or more flywheels 152 or deactivating/activating a previously active/inactive flywheel 152, reporting usage data and/or state information, and so forth.

In some implementations, the node 140 application 240 may executed on or in communication with a controller 254, which may be a computing device that controls components of a node 140, such as a mechanical battery (e.g., a flywheel), chemical battery, or various other components. For instance, the controller 254 may include a central nervous system (CNS) or computer that receives sensor data, provides instructions to inverters, motors, or other components, or performs other operations. For instance, the node 140 application 240 may be executed on the controller 254 or CNS to communicate with node 140 components and/or an EaaS manager 110 or another external component.

The flywheel manager 244 of the node 140 application 204 may be configured to communicate with the controller 254 to provide operational control signals, such as power banking signals, power extraction signals, spin rate adjustment signals, flywheel enablement/disablement signals, and so forth. The energy manager 246 is configured to communicate with the flywheel manager 244 and provides controls signals to the flywheel manager depending on the energy requirements (produce energy for local use, produce energy for utility use, bank local energy, bank utility-provided energy, etc.).

The flywheel coupler 255 may be configured to control the mechanical coupling of the flywheels 152 with the motor-generator 310, the flywheel selector 256 is configured to select which flywheels 152 to control based on the received control signals, and the flywheel monitor 257 monitors the state of each flywheel 152 for safe operation and performance within defined operational parameters, and can take control of the functionality of the MESU hardware 258 and shut down, slow, suspend, adjust, optimize, or other control the MESU hardware 258 depending on the monitored state.

Figure 3A:
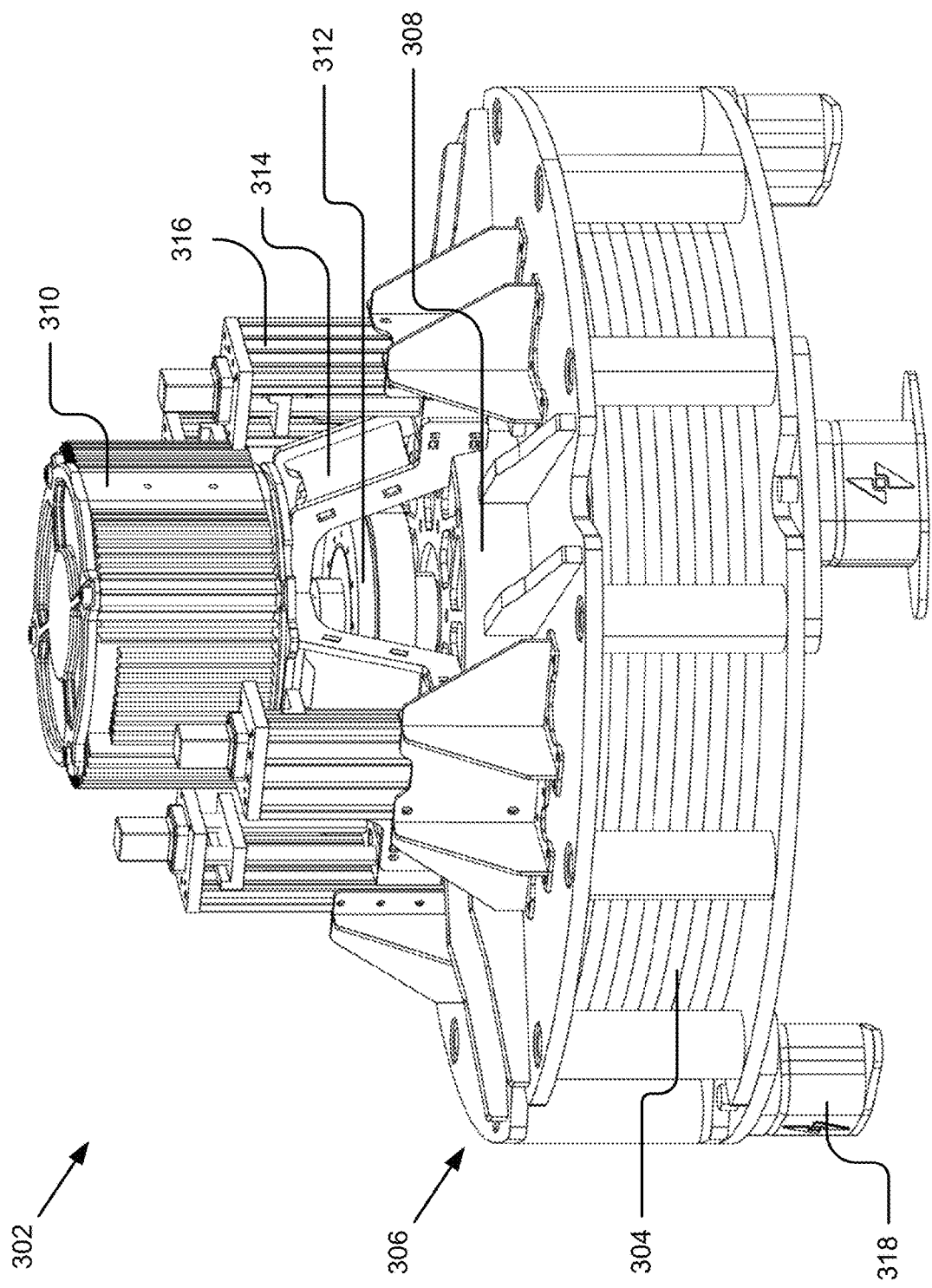
FIGS. 3A and 3B illustrate perspective views of example energy storage unit assemblies.
Figure 3B:
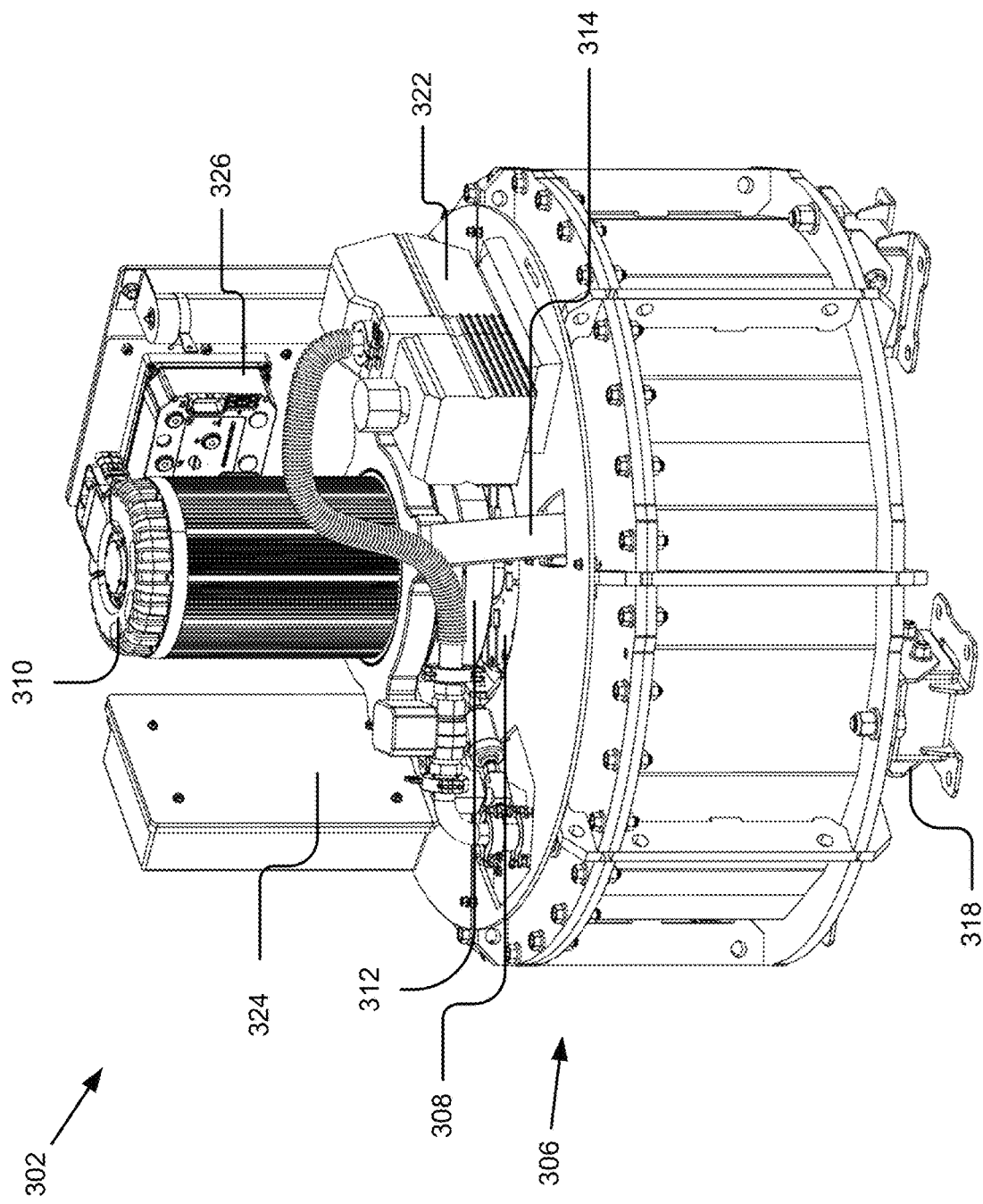

FIGS. 3A and 3B illustrate example implementations of a mechanical-energy storage unit (ESU) assembly 302 that may use a flywheel 304 to store energy using rotational momentum. FIG. 3A illustrates a perspective view of an example ESU assembly 302 with an open housing 306 to expose a flywheel 304. FIG. 3B illustrates a perspective view of an example ESU assembly 302 with an enclosed housing 306. FIG. 3B also illustrates various components, such as a supercapacitor 324 or battery, a vacuum pump 322, and a computing device 326 (e.g., a CNS).

It should further be noted that, for the purposes of this disclosure, the flywheel 304 and ESU assembly 302 are provided only by way of example and that other local energy storage devices are possible and contemplated. In some implementations, the technology may apply to chemical or other energy storage, such as chemical batteries, supercapacitors, flywheels, gravity-based batteries, and/or combinations thereof.

For example, while other implementations are possible and contemplated herein, FIGS. 3A and 3B illustrate example mechanical-energy storage unit (ESU) assemblies 302, that use a flywheel 304 to provide energy storage. As illustrated in the example implementation of FIGS. 3A and 3B, an ESU assembly 302 may include a flywheel housing 306 providing support to a flywheel bearing 308 that provides support to the flywheel 304. The flywheel bearing 308 may suspend and allow a flywheel 304 to rotate within a cavity or space in the flywheel housing 306, for example, about a central axis of rotation. A motor-generator 310 may be coupled or couplable with the flywheel 304 via a flywheel coupler 312 to exert rotational force thereon or receive rotational force therefrom. In some implementations, the ESU assembly 302 may include various other components, such as frames, actuators, electronics, cases, reinforcements, legs 318, etc., which are described elsewhere herein.

It should be noted that, although certain components and configurations are described herein, other implementations are possible and contemplated herein. For example, an ESU assembly 302 may include fewer, additional, or different components. In some implementations, the ESU assembly 302 may have various other configurations, for example, it may be oriented in various directions, such as where a motor 310 is located below the flywheel 304 or at a side of it, or otherwise.

In some implementations, although not illustrated in the examples of FIGS. 3A and 3B, the ESU assembly 302 may include other components, such as inverters, wiring, switches, sensors, transformers, and/or other power converting or transmission equipment that communicates electrical current from and/or to an external power source, such as an electrical service panel, solar panel system, electrical grid, etc. The equipment may additionally or alternatively couple the ESU assembly 302 to various loads, such as a power grid, electrical service panel, electric vehicle charger, etc.

In some implementations, the ESU assembly 302 may include and/or be coupled with various control equipment, such as a computing device or other control unit that executes various operations, etc. For example, the ESU assembly 302 may be part of a node 140 and coupled with a controller 254 and/or node 140 application 240. For example, the ESU assembly 302 control unit may represent an implementation of the controller or one of its components. The ESU assembly 302 control unit, etc., as described above may perform various operations respective to the ESU assembly 302, such as described in further detail elsewhere herein.

The example ESU assembly 302 may include one or more chemical batteries, supercapacitors, inverters, motors, or other components, which may be monitored by one or more sensors. For instance, the ESU assembly 302 may include temperature, rotation, and acceleration sensors in or adjacent to the bearings or axles of the flywheel. Similarly, temperature sensors may be located adjacent to a chemical battery or other components. An inverter may be coupled with the ESU assembly's 302 controller and may provide various other information, such as current, voltage, etc. Accordingly, as noted in more detail elsewhere herein, status or diagnostic data may be gathered by the controller and used, by the controller (e.g., a controller 254, node 140 application 240, CNS, etc.), to identify faults or other events. The controller 254 may automatically perform operations locally and/or transmit messages to a remote server for further processing.

In some implementations, all or a portion of the ESU assembly 302 may be placed within a case or enclosure to provide protection to the ESU assembly 302, protection from potential flywheel structural failure, and/or a vacuum, which increases flywheel efficiency. For example, a vacuum may be permanent or actively maintained using a vacuum pump 322. An example enclosure is described in further detail below.

For example, as illustrated in FIG. 3B, the enclosure 306 may be fully enclosed to house a flywheel 304 therein. The enclosure 306 may include a vacuum pump 322 coupled with the top of the enclosure 306, which may be powered by the motor/generator 310, supercapacitor 324, a battery (not shown), an external grid, or otherwise. The pump 322 may maintain a given vacuum pressure inside the enclosure 306 in order to reduce resistance on the flywheel 304. In some implementations, the vacuum pump 322 and/or enclosure 306 may include one or more sensors indicating a status and/or pressure of the pump 322 or enclosure 306.

As illustrated in the example of FIG. 3A, the ESU assembly 302 may include a flywheel 304 including one or more plates coupled at a central axis of rotation to a flywheel bearing 308, which allows the flywheel 304 to rotate about the central axis. The flywheel 304 may be housed within and supported (e.g., by the flywheel bearing 308) by the flywheel housing 306. The ESU assembly 302 may include a motor 310 assembly including a motor 310 adapted to convert an input electrical current to rotational momentum by spinning up the flywheel 304 and/or convert the rotational momentum of the flywheel 304 into an output electrical current. The flywheel 304 may be coupled with the motor 310 using a flywheel coupling 312 that imparts rotational force between the motor 310 and the flywheel 304.

In some instances, the flywheel 304 may be allowed to spin or freewheel relative to the flywheel housing 306, for example by allowing a motor 310 to spin freely and/or allow the flywheel coupling 312 to decouple, as described in further detail below. For example, the ESU assembly 302 may include a motor 310 frame 314 that holds the motor 310 and may allow the motor 310 to be moved, depending on the implementation. Additionally, or alternatively, the ESU assembly 302 may include a coupling lifter 316 or other mechanism that electronically couples and/or decouples the flywheel coupling 312 and/or the motor 310 via the motor frame, as described in the examples below.

A flywheel 304 may include a massive wheel that rotates about a central axis. In the example of FIG. 3A, several metal disks may be used and coupled together, for instance using bolts passing through the disks or clamping the disks together. For example, the flywheel 304 may include disks, rings, or a solid structure.

In the example, ten flywheel disks are shown in FIG. 3A; however, other quantities and configurations are possible and contemplated herein. The thicknesses, sizes, shapes, and quantities of the disks or plates may vary. For instance, the number of disks can be varied to adjust the amount of energy storage of a mechanical-energy storage unit where additional disks provide additional storage for a minimum in additional cost and complexity without correspondingly increasing a probability of structural failure. The disks may be solid plates, have various perforations (e.g., for bolts or a hub), be circular or other shapes, or have other configurations. Ideally, the disks are symmetrical or otherwise balanced to reduce vibrations when the flywheel 304 is spinning.

Depending on the implementation, the flywheel 304 may be constructed from aluminum, steel, concrete, composite, another material, or a combination thereof. For example, a set of steel flywheel plates or disks coupled together, each of which may be a quarter inch, half inch, inch, or other dimension thick. Other implementations, such as a combination of aluminum and composite (e.g., carbon fiber, etc.) are described in further detail below. In some implementations, the disks may include or be reinforced using other materials, such as Kevlar®, fiberglass, or carbon fiber, as described elsewhere herein.

The flywheel 304 may have various dimensions that are based on material strengths of the flywheel 304, desired rotational speeds, and/or desired storage capacities. For example, in order to improve manufacturability, decrease danger of material failure, allow the flywheel 304 to be placed at residences or other small-scale applications, the diameter of the flywheel 304 may range between 6 inches to 36 inches, although other sizes are possible. For example, a flywheel 304 may have a diameter of approximately 25 inches and a thickness of 5-12 inches. As noted elsewhere herein, increasing the quantity of disks may increase an energy storage capacity without increasing rotational speeds.

Although many other implementations are possible and contemplated herein, the flywheel 304 may have weights ranging from 100-1500 pounds, spin at 5,000-25,000 RPM, and have storage capacities of 3-15 kWh, depending on their sizes and materials. For example, by increasing the diameter or quantity of plates, the flywheel energy capacity may be increased to 15-500 kWh. These and other examples provided herein are meant as non-limiting examples and various sizes, materials, configurations, and storage capacities are possible and contemplated.

Various radiuses and rotational velocities may be used to address radial and circumferential stresses. For instance, decreasing diameters may decrease radial stresses but also decrease angular momentum. As material strengths increase, rotational speeds may be increased to correspondingly increase energy storage. As noted elsewhere herein, the RPM of the flywheel 304 may be monitored by a control unit (e.g., a controller 254) based on motor 310 speed or one or more sensors, so that the control unit can determine a current energy storage as well as keep the rotation within a target, efficient, or safe speed.

In some implementations, the flywheel 304 may have an aperture through its center where a hub and/or axle may be placed, although no through-hub is necessary. The hub may include a cylinder coupled to a rod like axle, which, in turn, is coupled with the flywheel coupler 312 or directly coupled with a motor 310, gear, bearing assembly, flywheel bearing 308, or otherwise. The hub may be bolted, glued, welded, or pressure fit to the plates. For instance, during assembly, the hub and plates may be placed together expanded to differing degrees based on temperature or expansion ratios and, when allowed to equalize in temperature, shrink to create tension and gripping force. The disks may be disks or rings around the hub or may be solid at a center and otherwise coupled with the axle.

Returning to FIGS. 3A and 3B, an ESU assembly 302 may include a motor 310 that may be coupled with the flywheel(s) 304, for example, at a central axis, hub, or axle, by a flywheel coupling 312. The motor 310 may be housed in a motor housing, a rotor of the motor 310 may be located at the central axis and coupled with the flywheel coupling 312 to rotate with the flywheel 304, although other implementations, such as where belts, gears, pulleys, or other devices for coupling the motor 310 to the flywheel 304 may be used. The motor 310 may serve as a motor 310 to drive the flywheel 304 and/or a generator to receive energy therefrom.

In some implementations, the mechanical-energy storage unit assembly 302 may include or be coupled with a motor 310, which may be a generator and a motor, and which may spin up the flywheel 304 to add energy and receive energy from the flywheel 304 to send energy to an output. The motor 310 may have various configurations and sizes depending on the quantity or total mass of the flywheels 304, a target rotational velocity of the flywheels 304 or motor 310, a target efficiency, a weight rating, or other implementations. The motor 310 may be coupled with various other electronics, such as an electronic control unit that measures the electrical input or output, rotational velocity of the motor 310, health of the system, position of the flywheel coupling 312, position of the lifter 316, or other statuses. The electronic control unit may cause electrical current from an external source to be input into the flywheel 304 via the motor 310 or output via the motor 310. The motor 310 may also include or be coupled to various other electronics, such as inverters, alternating current converters, transformers, or other electrical devices.

Alternating current motors or direct current motors may be used, for example, the motor 310 may include a permanent magnet motor 310 or, in order to allow the motor 310 to freely spin, the motor 310 may be an induction motor 310 that allows the motor 310 to freely spin when current is not being applied or received, so that the flywheel 304 can freely spin (e.g., where the flywheel coupling 312 is not decouplable). Other types and configurations of motors are possible and contemplated.

As illustrated in the examples of FIGS. 3A and 3B, a motor 310 may be mounted to a flywheel housing 306 using a motor 310 frame 314, which may hold the motor 310 to align the axis of rotation of its rotor with the axle of the flywheel 304. In some implementations, the motor 310 frame 314 may be mounted directly to the flywheel housing 306 (e.g., as shown in FIG. 3B) or it may be mounted via a coupling lifter 316 (e.g., as shown in FIG. 3A) that may move the flywheel coupling 312 (e.g., a motor component) and/or motor 310 to decouple it/them from flywheel 304. For instance, a motor 310 assembly may include a frame 314, motor 310, coupling lifter 316, and/or other components that support the motor 310 and/or flywheel coupling 312.

The flywheel 304 may be housed in a flywheel housing 306, which may be a steel, aluminum, glass, plastic, composite or other housing for providing support to the flywheel(s) 304. For instance, the flywheel housing 306 may include a metal (e.g., aluminum or steel) plate on the top of the flywheel 304, a metal plate on the bottom of the flywheel 304, various reinforcing members, and housing supports for coupling the top and bottom plates. In some implementations, the top metal plate, or other components of the flywheel housing 306, which is near moving magnets (e.g., of the motor 310, flywheel coupling 312, or flywheel bearing 308) may be constructed from plexiglass or another non-conductive material to reduce induced eddy currents and associated inefficiencies.

The ESU assembly 302 may include a flywheel bearing 308 integrated with or coupled with the flywheel housing 306 and providing vertical and/or horizontal support to the flywheel 304. Depending on the implementation, the flywheel bearing 308 may include fluid, magnetic levitation, ball bearings (e.g., ceramic or ceramic hybrid), Teflon®, and/or other bearings. For instance, the flywheel bearing 308 may use a first type of bearing (e.g., ball bearings) horizontally and a second type of bearing (e.g., magnetic levitation) vertically. In other implementations, the flywheel bearing 308 may be completely based on magnetic levitation. The quantity, type, and spacing of magnets in either side of a magnetic levitation bearing may be based on a total mass of the flywheel(s) 304 and/or other spinning structure.

As illustrated in example FIG. 3B, the ESU assembly 302 may support a supercapacitor 324 or a chemical battery that couples with the motor 310 and covers temporary high-current needs in order to start or the motor 310/flywheel 304 moving or stop it. The supercapacitor 324 may include sensors and/or may otherwise communicate with the controller 254.

As illustrated in example of FIG. 3B, the ESU may include a computer housing 326, which may support a controller 254 or CNS (e.g., a central nervous system), an inverter, or various other components. For instance, the CNS may communicate with an inverter, motor 310, sensors, or various other components to detect statuses, events, faults, etc., as described throughout this disclosure.

Figure 4A:
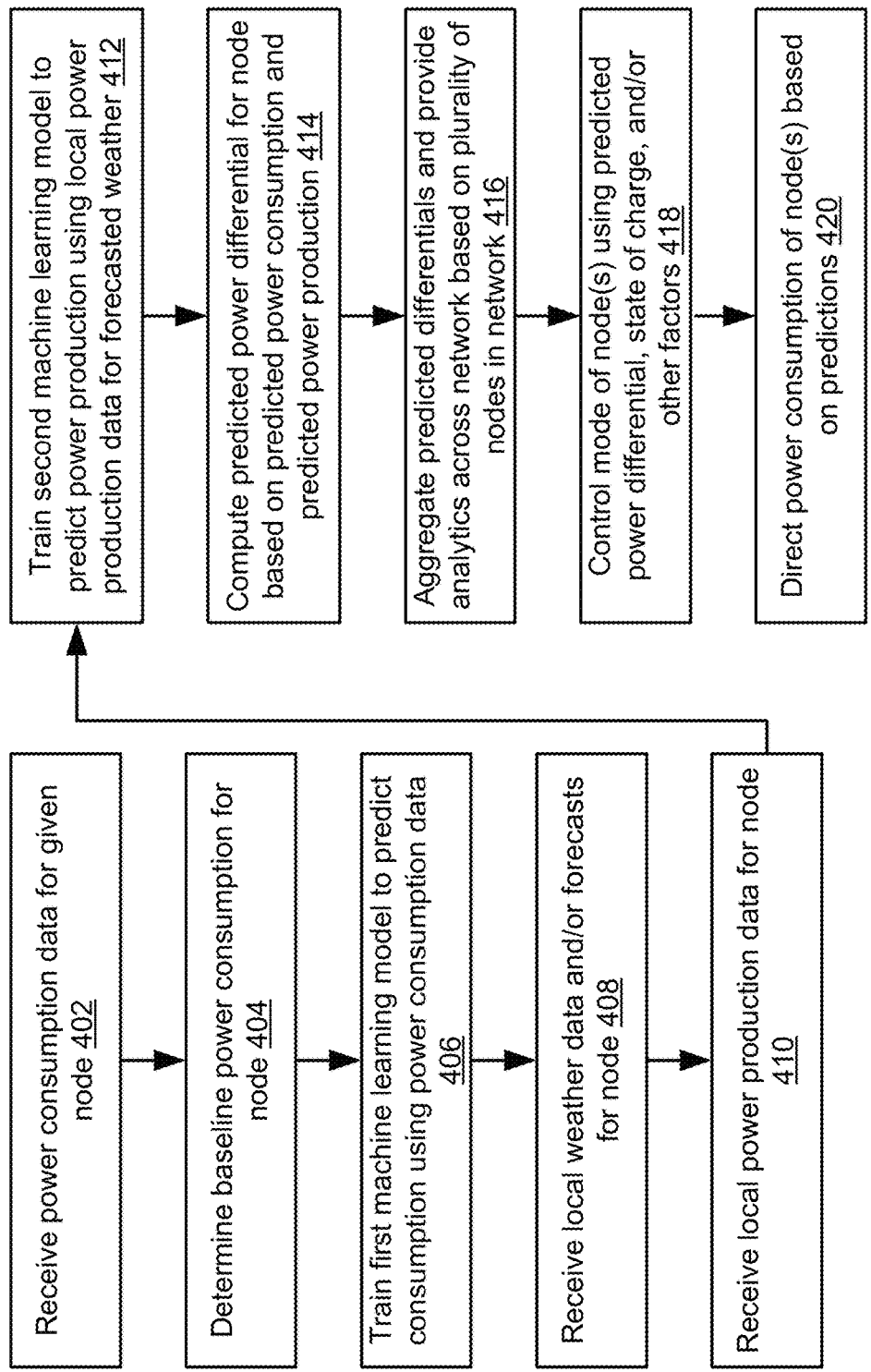
FIG. 4A illustrates a flowchart of an example method of artificial intelligence-based management of energy storage units.

FIG. 4A is a block diagram of an example method of artificial intelligence-based management of energy storage units.

In some implementations, at 402, the system (e.g., a training engine 114) may receive power consumption data for a given node 140, such as a residence having energy consumption, storage, and/or production equipment. For instance, the residence may have one or more local computing devices coupled with a solar panel array, an energy storage unit (e.g., a chemical or mechanical battery), and one or more loads. For instance, the computing device(s) may track energy usage by communicating with smart devices, a smart electrical meter, a smart electrical service panel, and/or one or more current sensors for circuits. The power consumption data may be determined over a defined historical time period and timestamped to provide a time-dependent data set. The data may be calculated, collected, aggregated, or otherwise have various resolutions, such as every second, thirty seconds, one minute, fifteen minutes, hour, or otherwise.

For example, a training engine 114 of an EaaS manager 110 may communicate with one or multiple smart devices, such as a central nervous system or controller 254 of a node 140 in order to gather data as it is delivered. The training engine 114 may also receive data from a power usage meter that gathers data about how much current is being used at a given time. The power meter (e.g., an Acrel™ meter) may include a smart service panel or a clamp-on meter that detects the electrical or magnetic field due to current in a wire. The training engine 114 may be communicatively coupled with the power usage meter or may retrieve its timestamped data from a controller 254 of a node 140 of from a server (e.g., via application programming interface(s)) associated with the power meter. In some cases, a power meter may automatically identify devices using power based on the current profiles (e.g., an air conditioner compressor may have a distinct startup and usage curve), accordingly, the power usage of an entire home, circuit, or individual device may be determined by the meter, training engine 114, or another analytics service.

In some implementations, the training engine 114 may also receive or retrieve power consumption data from smart devices, such as Internet connected refrigerators, thermostats, washers/driers, HVAC (heating ventilation and air conditioning) units, electrical vehicle chargers, heaters, smart switches or bulbs, home automation controllers, or other smart devices that may report data (e.g., time-stamped data) regarding their power consumption, which the training engine 114 may receive or retrieve directly or via one or more third-party servers 116 associated with the smart devices.

In some implementations, the training engine 114 may also gather other data points, which it may use to further improve the training of consumption model(s). For instance, the training engine 114 may also receive or retrieve sensor data indicating an internal or external temperature of a premises, weather data from a local power station (e.g., 143) or a weather service (e.g., the National Weather Service™ on a third-party server 116), premises occupancy, or other contextual information. This information may be time-stamped and/or otherwise associated with the consumption/usage data for the given node 140.

Accordingly, consumption data may be divided into individual consumption/usage elements, values, files, or entries from various sources and may be associated with categories, flags, context data, and may have various resolutions, where it is collected, received, stored, or processed at various periodicities, such as every second, although other frequencies are possible and contemplated herein.

In some implementations, at 404, the system (e.g., a training engine 114) may determine one or more baseline power consumptions for the node 140. A baseline power consumption may be a power consumption or usage of the node 140 excluding electrical loads that may be deferred (or their usage otherwise shifted in magnitude or timing) or shut off, such as lights, electric vehicle chargers, electric driers, etc., or excluding other defined loads. For instance, a baseline current may be the current drawn by devices in their standby state. The system may, for example, determine the lowest current drawn over a day or at various timestamps throughout the day (e.g., more current may be drawn at certain times). In some instances, the system may subtract the consumption of various devices from the node 140's overall consumption based on the received/determined consumption data. For instance, where all power consumption data for a node may be a first set of data, the baseline power consumption may be a subset of the set of data. The subset, as noted herein, may omit power consumption of one or more controllable (directly or indirectly) loads for the node(s) 140.

It should be noted that, for purposes of this description, the term baseline power consumption or usage may refer to a nominal, regular, consistent, or base power draw of one or more electrical loads. It may be an average, low-average, median, or other quantity and may be stored in a table in association with its timestamp, category (ies), tags or flags, source, variability, associated context, or other details. For instance, an average time-dependent power draw of a premises may be determined, and controllable, optional, or time-shiftable power usage (e.g., due to periodic EV charging, periodic use of an electrical oven, etc.) may be subtracted from the average to indicate the nominal draw or baseline consumption of that premises, although this is provided only as an example and other implementations are possible and contemplated herein.

In some implementations, the training engine 114 may automatically classify data points (e.g., power consumption from various devices) into categories based on type of device, instant or total power usage, power usage timing (e.g., day, night, regularity of usage, whether the usage is predictable, etc.) source, frequency, whether the device is able to be controlled by the EaaS manager 110, whether a user or administrator has set the device as controllable (or established an integration or automation with the device), or based on another defined parameters, such as whether the device is defined or classified as necessary or being deferable. For instance, regular evening lighting in a house may be classified as a baseline power usage, even though it is controllable, while EV charging or clothes washing may be classified as optional or deferable usage because typical electric cars do not need to be charged every day or laundry can be deferred to a subsequent day (or scheduled for afternoon instead of morning or evening). These classifications and parameters may be defined by an administrator, or a homeowner associated with the node 140, for example.

In some instances, the baseline power consumption may be defined as the total consumption of a premises (e.g., of all devices or all power draw) less detectable or controllable consumption from a defined set of devices or orchestrations, such as from a thermostat, electric vehicle (EV), EV charger, or orchestrations or integrations with other devices or services, such as via data received or sent via a server (e.g., via APIs) of a smart thermostat, EV, EV charger, smart home controller, etc. For example, a baseline power consumption may a fixed power consumption for a home absent variable loads that could be layered on top of the baseline consumption depending on a number of factors, such as defined settings by a homeowner or administrator to optimize their system. In some implementations, the user setting may be explicit, such as an explicit selection in a graphical user interface, or implicit, such as by integrating a device (e.g., logging into, providing permissions, or otherwise coupling a smart EV charger or smart thermostat with the EaaS manager 110 or training engine 114).

In some implementations, there may be intermediate categories of power usage, or the categories of power usage may change depending on time of day, day of the week, month, weather, user input or preference, or other context. For instance, lighting may be defined as a necessary or a nominal draw in the evening, heating or cooling may be classified as partially time-shiftable, and EV charging may be entirely time-shiftable or deferable. For instance, the training engine 114 may weight power usage by HVAC to have a partially baseline power draw and a partially deferable power draw because it can be reduced or deferred by a small percentage or short time, but not entirely shut off. For instance, if power consumption over a given time by an HVAC unit is defined to be reduceable to 80 percent consumption, 80 percent of the current may be classified as baseline while the remainder is considered optional, deferable, or time-shiftable usage.

Depending on the implementation, the baseline power consumption for the node 140 may be the total of all devices or data points in various time resolutions or increments. Power consumption data may be totaled into buckets for time increments (e.g., each second, five seconds, thirty seconds, minute, fifteen minutes, hourly, or other data resolutions) for example, to determine baseline power consumption (and/or non-baseline consumption) in each increment. As noted, data points may be classified into baseline or non-baseline for purposes of determining the data consumption at each time increment. In some implementations, the data resolution may be increased (e.g., beyond resolution of received data) or reduced (e.g., totaled or averaged for an entire day) by summing, averaging, smoothing, or using recursion to project datapoints.

In some implementations, data points for data sources may be classified as baseline in some circumstances or non-baseline in other circumstances. For instance, power consumption due to interior lights during the daytime may be classified as non-baseline (e.g., that it may be shut off, deferred, etc.) while during the evening may be classified as baseline. As another example, a user, via a graphical user interface, may indicate preferences for power consumption that should or should not be adjustable. For instance, the user may indicate that HVAC power usage should be classified as baseline while EV charging may be shut off, time shifted, deferred, etc. (e.g., classified as non-baseline usage).

In some implementations, at 406, the system may train a machine learning model based on the consumption data and associated data, such as time of day, concurrent weather (e.g., as determined at 408, which may be performed partially or fully before 406, depending on the implementation, as noted above), day of the week, occupancy of a premises 142, or other context. This model may be referred to herein, for convenience, as a consumption model. For instance, these various contextual factors may be fed into a machine learning algorithm that trains the model against the historical consumption data. Accordingly, the system may train a machine learning model that predicts future consumption based on a given context based on the power consumption data that is specific to the node 140 (e.g., rather than generalized across a network of many residences or otherwise non-specific). Although a machine learning model is described for the consumption model, other models or algorithms, data tables, etc., may be used.

A consumption model may be trained by feeding a timeline of consumption data and, potentially, context into a machine learning algorithm to train a model. The consumption data on which the model is trained may be baseline data, non-baseline data, or a combination thereof. The consumption data, tags or flags associated with the consumption data, time of day, concurrent weather (e.g., received from a local weather station or weather service), day of the week, month, premises occupancy, or other historical data may be fed into a supervised or unsupervised machine learning algorithm. As an example, an XG boost or other regressor may be used, other boosted, regression models, or various other models/algorithms may be used.

The model may represent one or more probabilities and/or patterns that account for a current or past condition of the system to predict future consumption, for example, over the next few minutes, hours, day, five days, or other time period. In some instances, forecasted consumption predictions may be discounted or otherwise modified to take into consideration decreasing certainty of more distant dates. In some implementations, the model may generate forecasted consumption at various resolutions, such as at a second, minute, fifteen minutes, half hour, hourly, or other values, depending on administrative setting, processing power or time, or other factors.

The data may be trained using data at various resolutions, such as second level, sub-second level, minute level, or otherwise, as noted above. The consumption model(s) may be continuously (e.g., over a rolling time frame) or periodically (e.g., daily, weekly, hourly, etc.) trained using historical data over a defined time window, such as the previous day, previous month, previous year, or otherwise.

In some implementations, one or more initial models trained on data for a similar premises or cluster of premises (e.g., similar in size, usage levels, location, or otherwise) may be used for the reference premises. The initial model(s) may be then updated or trained using actual historical for the reference premises to create a node or premises-specific consumption model. As time moves forward, an initial or current consumption model may be updated or retrained. For instance, actual consumption data may be fed into a training algorithm. The actual data may be compared with the predictions in order to generate analytics or otherwise improve training.

In some implementations, at 408, the system (e.g., a training engine 114) may receive local weather data and forecasts for a node 140. For instance, the system may determine a specific geographical location (e.g., based on a latitude and longitude stored in a data file associated with the node 140) and may retrieve historical, current, and/or predicted weather data for that location from one or more third-party sources (e.g., provided by third-party server(s) 118), such as the National Weather Service.

In some implementations, the system may additionally or alternatively receive data from a local power station 143, such as a Tempest™ or other brand internet-connected weather station at a location of the node 140. In some instances, the historical or current data from the local power station 143 may provide corrective, offsetting (e.g., to indicate whether the location is typically warmer, cooler, etc.), or more accurate information than the National Weather Service for the specific node 140. As noted elsewhere herein, the weather data may be used train models or set context for using trained models.

In some implementations, at 410, the system may receive local power production data from the node 140. For instance, if the node 140 includes a solar, wind, hydroelectrical, gas generator, or another energy producing source, the system may determine the power production over time (e.g., with timestamps). It should be noted that this and other data may be received as a batch of data describing a time period or may be received in real time or otherwise determined in a data stream.

The power production data, similar to the consumption data, may be received or retrieved directly or via other services (e.g., via APIs of servers, etc.) from an inverter, power meter, smart service panel, or other device that reports power production data. Similar to the consumption data, the power production data may be received, determined, or processed at various data resolutions (e.g., second, sub-second, minute, fifteen minutes, or other resolutions). The power production data may be associated with various metadata, such as timestamps, source, context (e.g., weather), or other data.

In some implementations, solar or wind power production data may be estimated based on power production database(s) for the geographic location of the premises. Additionally, or alternatively, the solar may be determined based on the actual production at the node 140/premises. Different data sources may be combined or remain separate as they are used to train a second machine learning model, as noted below.

In some implementations, general or reference data may be used initially until more local data is generated or received. The model(s) may be updated or retrained as increasing amounts of data is received. Additionally, or alternatively, different models may be used or trained using different data sets, depending on the amount, consistency, or accuracy of production data from the premises, as described in further detail elsewhere herein.

In some implementations, the system may also gather energy storage data associated with the node 140, such as battery state of charge, energy capacity, discharge or charge rates, energy storage unit/device attributes etc. For instance, the system may determine the current state of charge and total energy capacity of a local chemical and/or mechanical battery.

In some implementations, at 412, the system may train or otherwise determine a second model (e.g., a machine learning model, although other models are possible and contemplated herein, as noted below) based on the power production data respective to its context (e.g., based on how much power is produced in a given context) for the given node 140, so that an accurate assessment for the specific node 140 can be determined. For instance, the system may combine the power production data for the node 140 with the weather data for the node 140 over time to generate a solar (or other) prediction model that can be used to predict future solar production for a given context (e.g., for a given weather pattern).

The system may combine the second model with weather forecast data for the node 140 to determine predictions of future solar production at a future point in time (e.g., for a predicted weather pattern at the node 140).

Figure 4B:
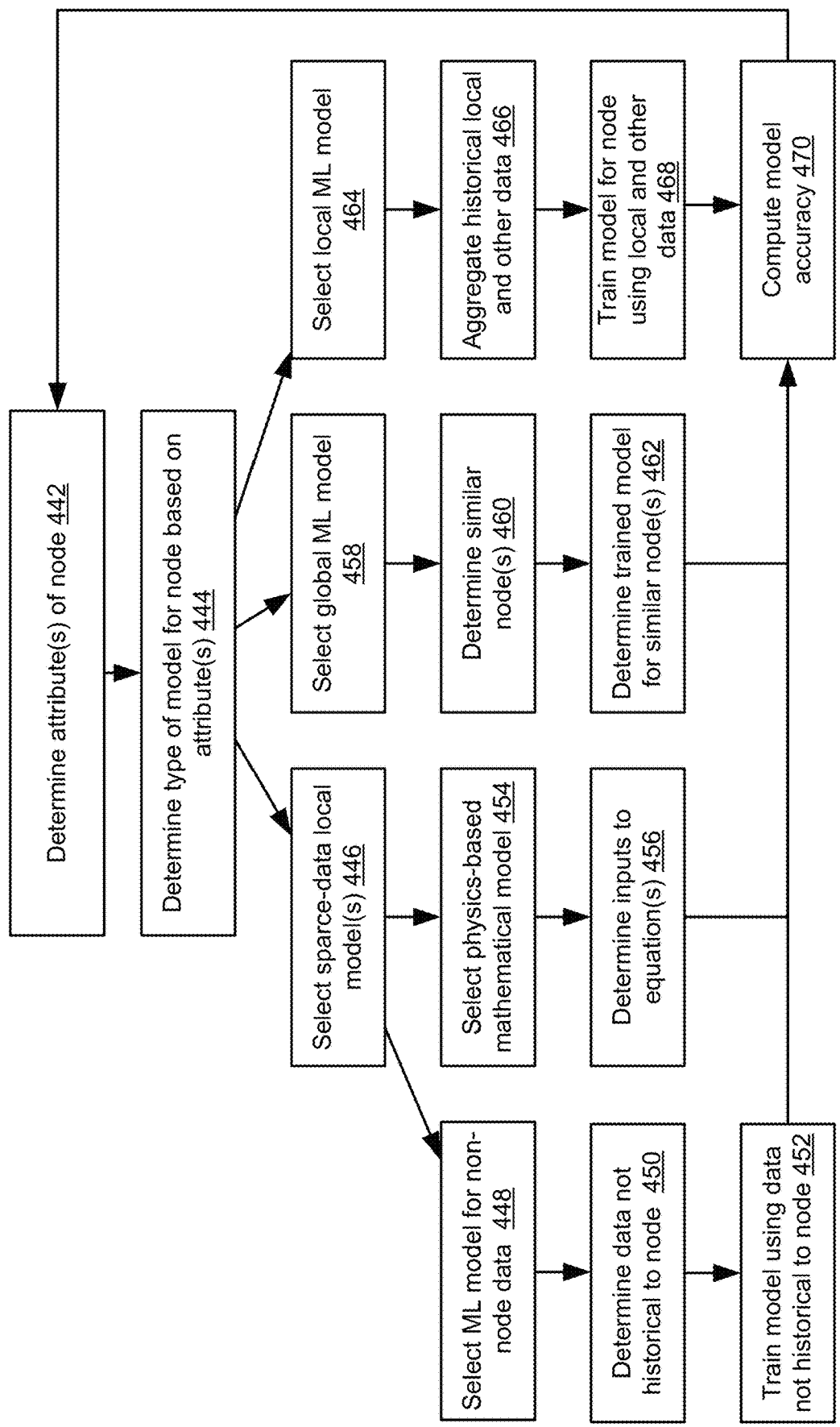
FIG. 4B illustrates a flowchart of an example method for determining a production model for a node.

Further details of the operation at 412 for determining and/or training a production model are described in reference to FIG. 4B, which illustrates a flowchart showing an example method for determining a production model for a node 140 or premises by the system (e.g., by a training engine 114). For instance, the operations for determining a production model may be based on an amount of historical production data for a node 140, local context, weather uniformity to other nodes 140, or other factors.

At 442, the system may determine one or more attributes of a node 140. Initially, the attributes may include whether a model has previously been established for the node 140, whether the node 140 has a threshold amount of historical data (e.g., power production data), or other information. In some cases, the attributes of the node 140 may indicate its geographic location, solar (or other power production) system size, whether it is in a net metering agreement with a utility, or otherwise, although some of these details may be determined during the processing of other operations in FIG. 4B. The attributes may be determined by retrieving data from a database 210, receiving user input, or via other means.

At 444, the system may determine a type of model for the node 140 based on its attributes. For instance, if the node 140 is a new node 140 for which little to no historical power production data is available, a sparce-data local model or a global model may be selected. If the sufficient historical production data is available for the node 140, a local model may be determined. Other criteria for determining models are further noted below, such as based on predictiveness of various models, attribute proximity with other nodes 140, or otherwise.

For example, at 446 a sparce-data local model may be determined for the node 140. The sparce-data model(s) may be selected for a new node 140 for which little to no historical production data, weather data, or other context data is available. In some implementations, the system may select from among multiple types of sparce data models for the node 140. This selection may be performed automatically based on defaults, node 140 attributes, or user input, for example.

At 448, the system may select a machine learning model that has previously been trained or to train for the node 140 using data that is not historical to the node 140 (e.g., because that data may be unavailable). For instance, historical weather data may be gathered for the node 140's geographic location and compared with non-specific power production data. For instance, various services or databases may provide data or algorithms indicating an estimated solar production for a location or larger region. For example, the system may leverage a database of solar production values that may be averages among a set of nodes 140, defined quantities based on expected production for time of year, or may be based on a mathematical calculator or algorithm (e.g., as at 454 below).

Accordingly, at 450, the system may determine data that is not historical to the node 140 and may, at 452, train a machine learning model for the node 140, which may be used to predict future production, as discussed elsewhere herein.

At 454, the system may select a physics-based mathematical model to use for predicting power production. For instance, the model may receive inputs or attributes for the node 140, such as the geography, angle or direction of panels, total solar panel capacity, or otherwise.

For example, the system may use an NREL (National Renewable Energy Laboratory™) algorithm, such as PVWatts™ or otherwise, which may indicate past or predict future solar production based on various inputs. The example PVWatts™ algorithm may take inputs such as DC system size, solar module type, array type, system losses, array tilt angle and array azimuth angle. The system may also optimize the model based on DC to AC size array, inverter efficiency, around coverage and snow impact on panels, or other details.

Additionally, or alternatively, the system may calculate an estimated irradiance for the panels using various other algorithms or calculators. For instance, an estimated energy produced by the panels may be represented by $E=A*r*H*P$, where E is the energy in kilowatt hours (kWh), A is the total area of panels in meters squared, r is the solar panel yield or efficiency percentage, H is the annual average solar radiation on tilted panels (e.g., based on latitude, weather, etc.), and P is a defined performance ratio that may be a constant for expected losses (e.g., between 0.5 and 0.9, such as 0.75 as a default value).

At 456, the system may determine inputs to the algorithms, equations, or calculators when computing a model and/or forecasts for the node 140. The inputs include the attribute(s) determined at 442, a current state of a node 140 (e.g., weather data from a local weather station, recent or real-time solar production, or other data). In some implementations, the system (e.g., the training engine 114) may train machine learning models for one or more of the inputs into the mathematical algorithm or calculator in order to improve accuracy for a defined node 140, set of nodes 140, or across calculations. Thus, the accuracy of these algorithms or calculators may be improved over time while the system still benefits from the efficiency of the calculators and smaller models for individual inputs.

In some implementations, at 458, the system may select a global machine learning model, which may be trained over a set of nodes 140 in a geographic region or based on other similarities. By using fewer models (e.g., across several or many nodes 140), the system may reduce training time and compute, promote cross-learning across nodes 140, scale to additional nodes 140 more easily, and may allow more accurate or easy model correction, although this type of modeling may not fully adapt to the nuances of a specific node 140.

For example, at 460, the system may determine one or more nodes 140 or sets of nodes 140 that share attributes (e.g., have a threshold similarity) to the reference node 140 and, at 462, the system may identify one or more trained power production models for the similar nodes 140. For instance, two models may be trained for a first and second set of nodes 140 in a given geographic region where the reference node 140 is located. The first model may be trained for nodes 140 with a net metering agreement while the second model may be trained for nodes 140 without a net metering agreement. Accordingly, if, for instance, the reference node 140 has a net metering agreement, the system may select the corresponding machine learning model. It should be noted that although two models based on example attributes are described, other models and attributes are possible.

Accordingly, the system may train models using power production data from multiple nodes 140 and then used to predict future power production at each individual node 140 in the set, or it may be used with other nodes 140 (e.g., for which historical data was not used to train the model(s)) that are similar.

Although other machine learning algorithms and models are possible, an XG (Extreme Gradient) boosted, gradient boosted, random forest, Profit™, or various other algorithms may be used to train predictive models. The algorithms may use various inputs, such as those described in reference to 456, historical power production data, historical local weather (e.g., from a local weather station), historical regional data (e.g., from a weather service), or other context or data.

At 464, the system may select a local machine learning model trained for the specific node 140. For instance, a local model may be trained where other models (e.g., at 446 and 458) are not sufficiently accurate, where the node 140 has a threshold amount of historical power production and/or weather (or other context) data or based on other criteria. For instance, where a solar panel array is placed on the side or ridge of a mountain, local conditions (shade, trees, weather) may vary significantly from other nearby nodes 140, so a local machine learning model may be trained for the node 140. This selection may be based on administrator input or may be automatically selected, for example, based on reaching a defined amount of historical data for the node 140 or based on other models being inaccurate.

At 466, the system may aggregate historical local data, such as the node 140's power production data, local weather data, or other local context data, as described elsewhere herein. In some cases, the system may also aggregate other non-local data, such as power production calculator outputs, regional weather, inverter efficiency, etc., and may feed the data into a training algorithm to generate a production model for the node 140.

In some implementations, the system may automatically identify missing data, for example, a time period during which the power production data was not recorded or received. The system may automatically match the available data (power production data, context, weather, etc.) for the period where data is missing against past time periods where good data was received. For instance, the system may automatically search for similar time periods and impute the data from those similar time periods into the missing data field/time period.

The system may train the model for the node 140 using the local and/or other data. Accordingly, a model for the node 140 may be able to automatically recognize differences in local weather from regional weather, a more accurate impact of time of day, time of year, weather, or other factors on the node 140's power production.

Although other implementations are possible, at 468, the system may train local models using a light GBM (gradient boosted model), XB boost, other gradient boosted algorithms, etc. For instance, the system may use a random forest regressor for the local model, although others may be used without departing from the scope of this disclosure.

At 470, the system may compute the accuracy of a power production model for any of the selected model types. For instance, the system may compare actual power production for the node(s) 140 in a time period with predicted values for that time period.

In some implementations, based on the model accuracy, acquisition of historical data, changing node 140 attributes, or user settings, the system may select a different model for the node 140. For instance, the system may default to using a global machine learning model but, if it determines that the global model is inaccurate for the node 140, the system may automatically train a node 140-specific model. It should also be understood that the accuracy of models may change over time as additional data is acquired. For instance, a local model may become more accurate as data is fed into the training algorithm(s).

Returning to FIG. 4A, in some implementations, at 414, the system (e.g., the power management application, or controller 254 of the node 140) may compute a predicted power differential for the node 140 based on the predicted power consumption and predicted power production for a given context (e.g., at a given time, for the predicted weather, etc.). These predictions can be updated in real time or periodically (e.g., every minute, hour, daily, etc.) based on additional context data received from various data sources, such as updated weather information, updated occupancy or power consumption status (e.g., an EV with a certain capacity and state of charge being plugged in), etc., for the node 140. Accordingly, using predicted power consumption (e.g., weather and use-schedule dependent power consumption) and predicted power production (e.g., weather-dependent solar production for the node 140), a predicted amount of surplus or need of power may be determined for a future point in time. The predictions could be determined at any time interval for any future point in time, for example, with decreasing accuracy over time or with increased reliance of the data/analysis on historical statistical data rather than current context or predicted weather. For instance, predictions could be made for fifteen-minute blocks over the subsequent five days, although other implementations are possible and contemplated herein. This data may be further based on the baseline power consumption.

Based on the predicted power differential, mode, or other data and computations, for instance, the system may perform one or more automated operations, such as controlling a mode of the node(s) 140, controlling consumption of controllable loads, transmitting or displaying directions to a user, or other operations, such as those described in reference to the operations at 416, 418, and 420.

The predicted power differential may be determined for time intervals (e.g., second, minute, fifteen minute, etc., buckets) for a defined time period, such as a day, five days, a week, etc. Predicted consumption may be subtracted from predicted production or vice versa to create a series of buckets and/or a differential curve.

Depending on the implementation, a total differential, integral, or area under the curve may be determined to identify production, consumption, storage over time periods. The total differential over time blocks may be compared with a battery capacity (e.g., of a chemical or mechanical battery) or target battery charge range to determine whether the battery has enough available charge/capacity to cover a period of excess power production or consumption (e.g., this information may be used as noted below). The time block for which power is determined may be fixed or rolling (e.g., a moving window), or other implementations are possible and contemplated.

The predicted power differential data is particularly powerful as it is specific to a given node 140, which may have very different consumption or production characteristics than another node 140 or premises (e.g., a residence) next door, in the same neighborhood, in the same city, or elsewhere in the state, etc. Accordingly, as noted below, the specific node 140 can be controlled to balance energy consumption, production, or storage for that node 140. Similarly, many nodes 140 in a group or network (e.g., a grid) of nodes 140 may be balanced against each other and/or against power production, storage, or use by an electrical utility provider. As noted below, using these predictions, the system may control how much energy is output, input, or stored by the node(s) 140.

In some implementations, the system may determine a predicted state of charge of an energy storage unit of the node 140 based on its current state of charge and the predicted power differential data over time. Accordingly, a future state of charge of the energy storage unit can be predicted. The system may determine a target state of charge for the energy storage unit and adjust current output or input of power out of/into the node 140 to maintain the target state of charge for the energy storage unit at a future point of time based on the predicted power differential data.

As noted in more detail elsewhere herein, the predicted or target state of charge may be based on a buffer range (e.g., a minimum or maximum energy percent stored), based on a mode, or other data. For instance, the energy storage unit may be set to "storm preparation" mode based on the weather forecast to increase the target state of charge in case of a power outage. Similarly, the system may proactively control the output/input of power from/to the node 140/energy storage unit to proactively balance power and reduce the "duck curve."

It should be noted that the energy storage unit may provide an electrical buffer and that the input or output of power from/to the node 140 may be controlled by the system by increasing/decreasing consumption (e.g., by scheduling power consuming activities, such as controlling an EV charger, air conditioner, or refrigerator) at given time, increasing/decreasing storage or output of an energy storage unit, increasing/decreasing power production, or otherwise.

Example power production, consumption, and/or differentials are described elsewhere herein. For instance, example graphical user interfaces graphically showing the production, consumption, and/or differentials are illustrated the figures herein, such as FIGS. 8A-9, which may also allow user interaction, display analytics, or perform other operations.

In some implementations, at 416, the system (e.g., the power management application 111 or other component of the EaaS manager 110 or utility server 120, for example) may aggregate the predicted power consumption, power production, power differentials, states of charge, available states of charge, or other data across multiple nodes 140. For instance, the system may provide data and analytics to an electrical utility provider or other administrative entity (e.g., of a virtual powerplant consisting of a multiplicity of nodes 140) managing the group of nodes 140. Accordingly, the provider can gain insight into what power will be needed, surplus, or available in storage at a future time. Thereby, the provider can determine when to ramp up or down a power plant, when and at what rate to purchase/sell power to another provider, or otherwise. For instance, the provider can control the group of nodes 140 to offset the needs of other customers of the grid and balance power production over areas (e.g., where weather varies) or over time (e.g., to flatten the duck curve).

The system may compare predicted consumption data, production data, and/or differential data with actual production data to determine the accuracy of the models. For instance, the actual and predicted differential curves may be compared. The comparison data may be provided in one or more graphical user interfaces to inform stakeholders regarding the accuracy of predictions. In some instances, the comparisons may be used to determine when to retrain or update models, how far out to use the predictions (e.g., if accuracy drops off beyond a defined threshold after three, five, or seven days), or otherwise. For instance, a time period during which node 140 modes, power consumption, or other factors may be defined based on the time period over which at least a threshold accuracy is determined.

The data may be analyzed either for a specific node 140, a cluster of nodes 140, a geographic area, or otherwise to evaluate predictions, determine cluster or utility wide power needs, such as so that power production can be adapted to an excess or deficit of power at a determined time. Accordingly, a utility server may control utility or grid production (or usage across many devices) proactively to charge up nodes 140, discharge nodes 140, or otherwise adapt to power production or consumption in certain premises, neighborhoods, or regions.

In some implementations, at 418, the system (e.g., a controller 254 of a node 140, power management application 111, EaaS manager 110, etc.) may control a mode of one or more nodes 140 using the predicted power consumption, power production, power differential, state of charge, storage capacity, electrical cost, or other factors. For instance, the mode of the node 140 may include whether the node 140 is in a power consuming or production state (or value thereof), the state of charge of an energy storage unit, the buffer values or ranges of an energy storage unit, or other configurations. For instance, the timing and amount of data used can be scheduled to minimize grid power used, balance power production/use, minimize cost of electricity, hit a target charge state or range, or based on other factors. In instances where the node 140 includes a flywheel, the mode may cause the flywheel to increase or decrease its rotational speed depending on whether the energy is being stored or released (e.g., by signaling an inverter to drive or receive current from a motor coupled with the flywheel).

For example, the mode may define an amount of power available from the grid or energy storage to be used by the node 140, an amount of power from the local-power production or energy storage unit to be output from the node 140 to the grid, a target state of charge or otherwise. The node 140 may be a power saving mode, a battery charging mode, a storm preparation mode, a maximum power production and use mode, etc. Accordingly, the system may control, for a single mode or multiple nodes 140, how much power is being used, stored, received from the grid, or output to the grid. The system may transmit an instruction to an inverter of the energy storage unit to output a certain amount of power to the grid, receive a certain amount of energy from the grid, and so forth. Thus, the system may control the state of charge of the energy storage unit, etc., to balance energy use in a grid as well as maximize the energy savings and ecological benefit of the node 140. These controls may be based on the baseline power consumption.

For example, the system may use that a storm is predicted in two days based on weather forecast data to modify the flow of power to/from the node 140. For instance, one or both of the consumption model and the production model may use the weather forecast information to determine a future power differential and also determine that, at that future point, the node 140 may be placed into a storm mode in which a chemical and/or mechanical battery stores a higher level of energy in case there is a power outage. If the ability of the node 140 to match a target charge level, future consumption, or otherwise is insufficient, for example, the system may instruct the node 140 to receive power from the grid and charge up the battery (or dump power to the grid), for example, to prepare for a predicted storm.

In another example, the system may predict, using the predicted differential, that there will be an excess level of power storage, production, or consumption at a future point. The system may track from the future point to a current or future point to determine when to switch modes of the node 140, for example, using a defined threshold rate of draw to a grid, output to a grid, charge or discharge rate to/from a battery (e.g., based on inverter capability), or other defined rates. Accordingly, the system may predict and proactively set modes to change the charge, power input, power output, etc., of a node 140 for predicted future consumption and/or production.

In some instances, the system may surface a notification on a graphical user interface to a homeowner, administrator, or other stakeholder to indicate a change in mode, a predicted excess consumption or production, or other details. In some instances, the user may manually change the mode or other details to change the predictions or behavior of the node 140. For instance, the user may request a higher charge level of a battery, request an additional consumption event beyond the baseline (e.g., EV charging, different HVAC setting, etc.).

Although the operation at 420 is described after 418, the order may be changed or may be performed in parallel. For instance, the consumption, production, and mode(s) of the node 140 may be modified in connection with each other in order to better utilize available power or capacity and/or reduce inconvenience.

In some implementations, at 420, the system (e.g., a controller 254 of a node 140, power management application 111, EaaS manager 110, etc.) may direct power consumption of one or more node(s) 140 or associated devices based on the predictions or mode, such as the predicted differential data, target and current state of charge, etc. For instance, the system may determine that the node 140 should be in a power consuming mode due to an excess of power in the battery and/or grid either currently or a forecasted future point in time. Accordingly, for example, the system may direct smart, connected devices to activate to use the excess power, such as turning on a swimming pool pump or heater, turning on an air conditioner, increasing current in an electrical vehicle charger, or otherwise. Accordingly, the system may provide local optimization of electrical consumption based off of the availability of renewable resources being generated, available battery capacity, or available power (e.g., during a power outage).

For instance, controllable devices, orchestrations, or integrations may be determined, such as for those producing the non-baseline power production noted above. The system may determine that there is an excess production at a given time and schedule the consumption of one or more of these devices to use the excess production at that time. Similarly, the system may determine that there is an excessive production/deficient production at a given time and shift controllable devices away from that time, for example. As an example, the system may send an instruction to an HVAC controller 254 to pre-cool a premises during the afternoon when solar production is highest in order to shift a controllable power consumption event from a low-production time period (e.g., during a nighttime). The control of devices based on the predictions may be performed according to various thresholds, such as where the system is allowed to cool the premises to 65 degrees Fahrenheit but not below that temperature, or the system is allowed to let the premises reach 80 degrees but not exceed that temperature.

In some implementations, the adjustments to energy consumption may also be done by outputting an instruction to a user or requesting authorization from the user, for example, using a graphical user interface, indicating that "now is a good time to do your laundry" or "the system recommends charging your EV between 3 pm and 6 pm today." Similarly, the system may instruct the devices or users to save energy at certain times.

In some instances, the user may override the instructions or recommendations of the system for either the mode of the node 140 or power consumption. For instance, the user may indicate that they wish to charge an EV immediately or to a higher percentage (e.g., 100 percent) in preparation for a road trip. Or the user may change an HVAC setting to have a different comfort level, etc.

Although control of nodes 140 and devices is described in terms of power storage and consumption, it should be noted that, in some instances, the system may also control power production, whether to affect an amount of power received from the grid or power production by a local device, such as a wind turbine or generator.

FIGS. 5A, 5B, 5C, 5D, and 5E illustrate example mobile graphical user interfaces 500a, 500b, 500c, 500d, and 500e, respectively, that may be generated by the technology described herein. For instance, the interfaces may display forecasting energy consumption, solar production, and smart grid management. The interfaces may show five-day, adjusted every fifteen-minute predictions of weather data, renewables production, home consumption, nominal draw, a predictive ESU power score, a personalized energy use plan for the day, or other data.

Figure 5A:
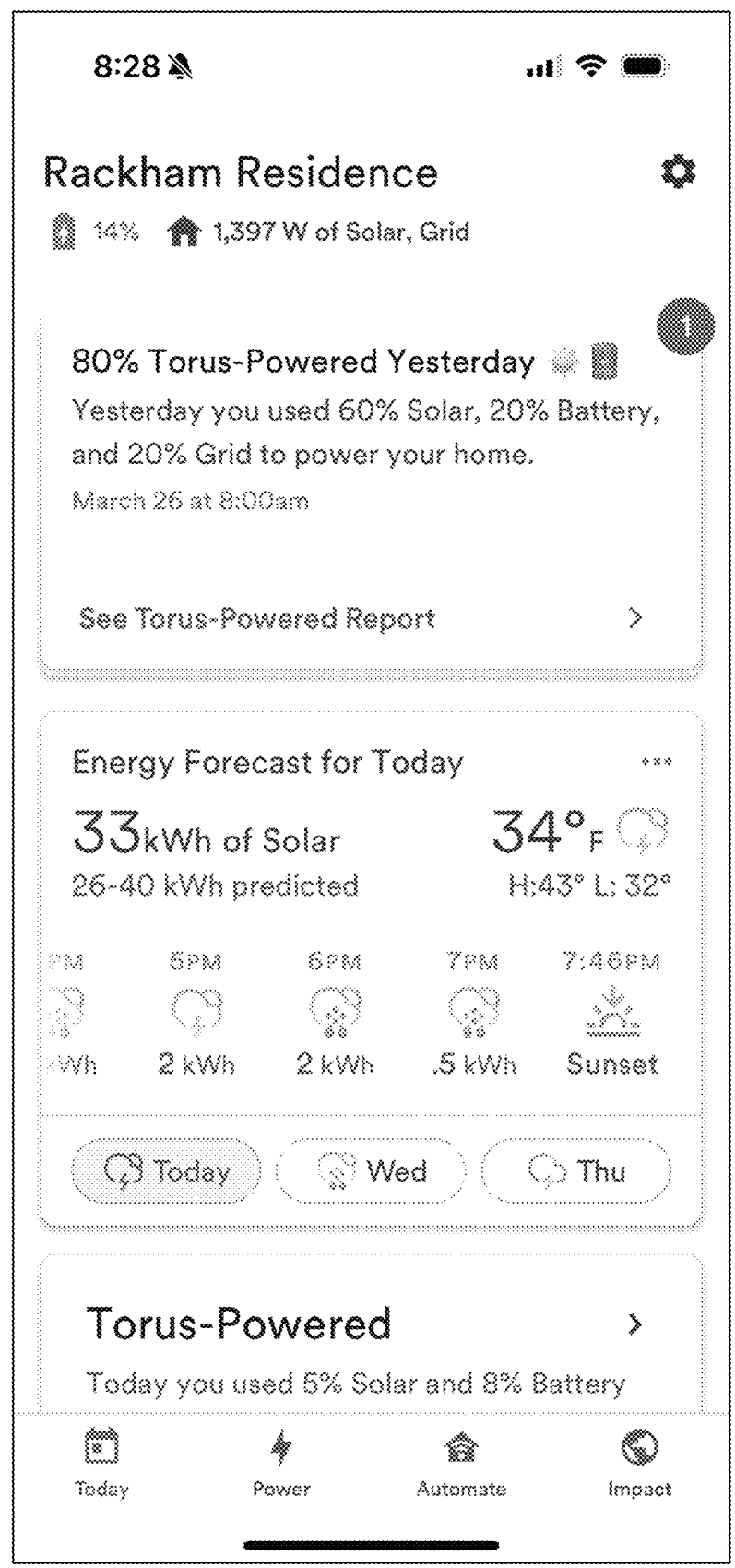
FIGS. 5A-5E illustrate example mobile graphical user interfaces showing energy usage or forecasts for one or more nodes.
Figure 5B:
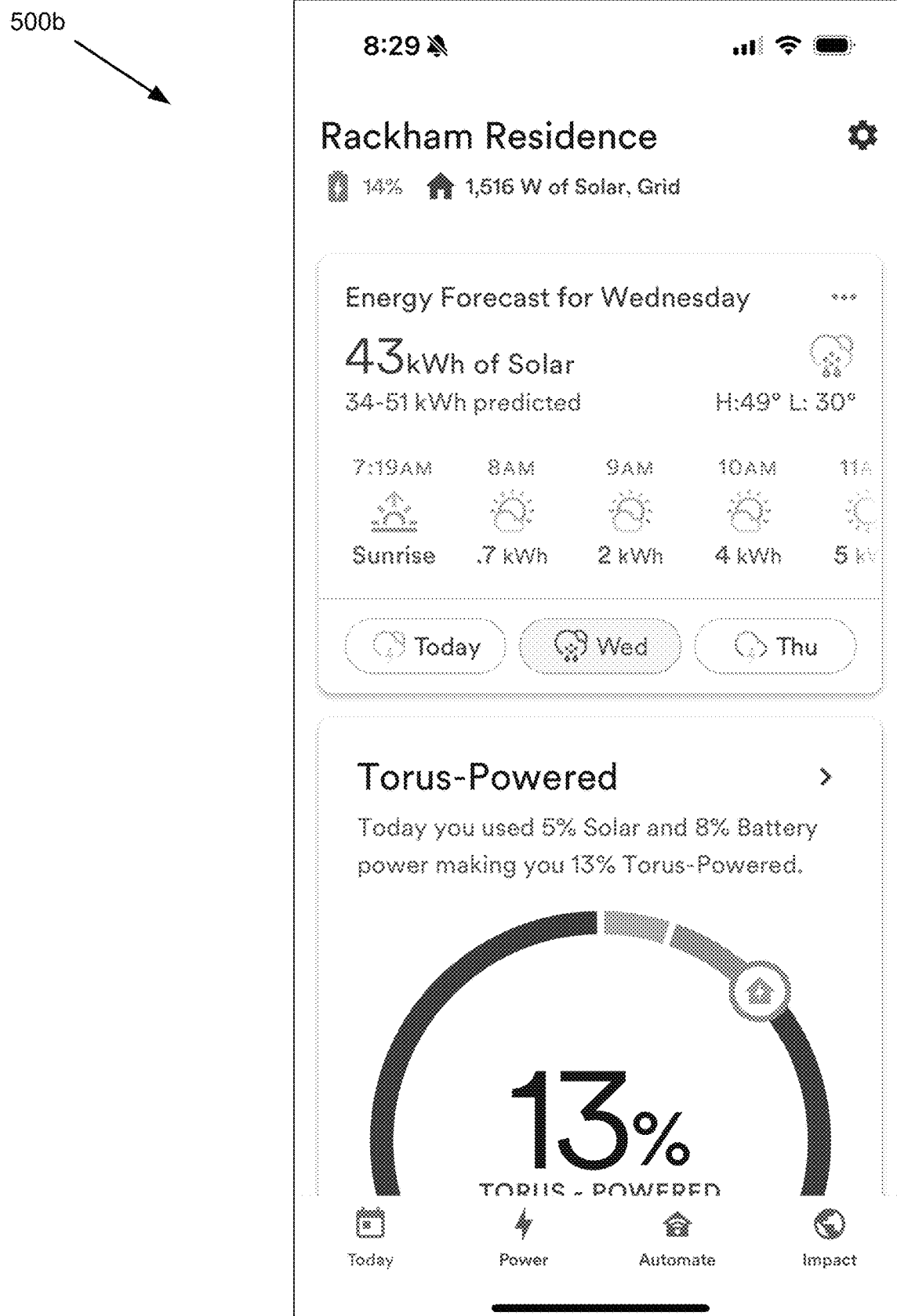

The example interface 500a in FIG. 5A illustrates weather forecast and solar production predictions. FIG. 5A shows an example energy forecast for a given residence. The interface 500a shows a total predicted power production over the day and over time periods, an analytics score (e.g., a percentage renewable power used, grid energy avoided, etc.), and predicted weather data. The example interface 500b in FIG. 5B illustrates a weather forecast and production prediction for a different, selected day. The example interface 500b also shows an example score or other analytics indicating how much solar, battery, grid, or other power is being used or saved.

Figure 5C:
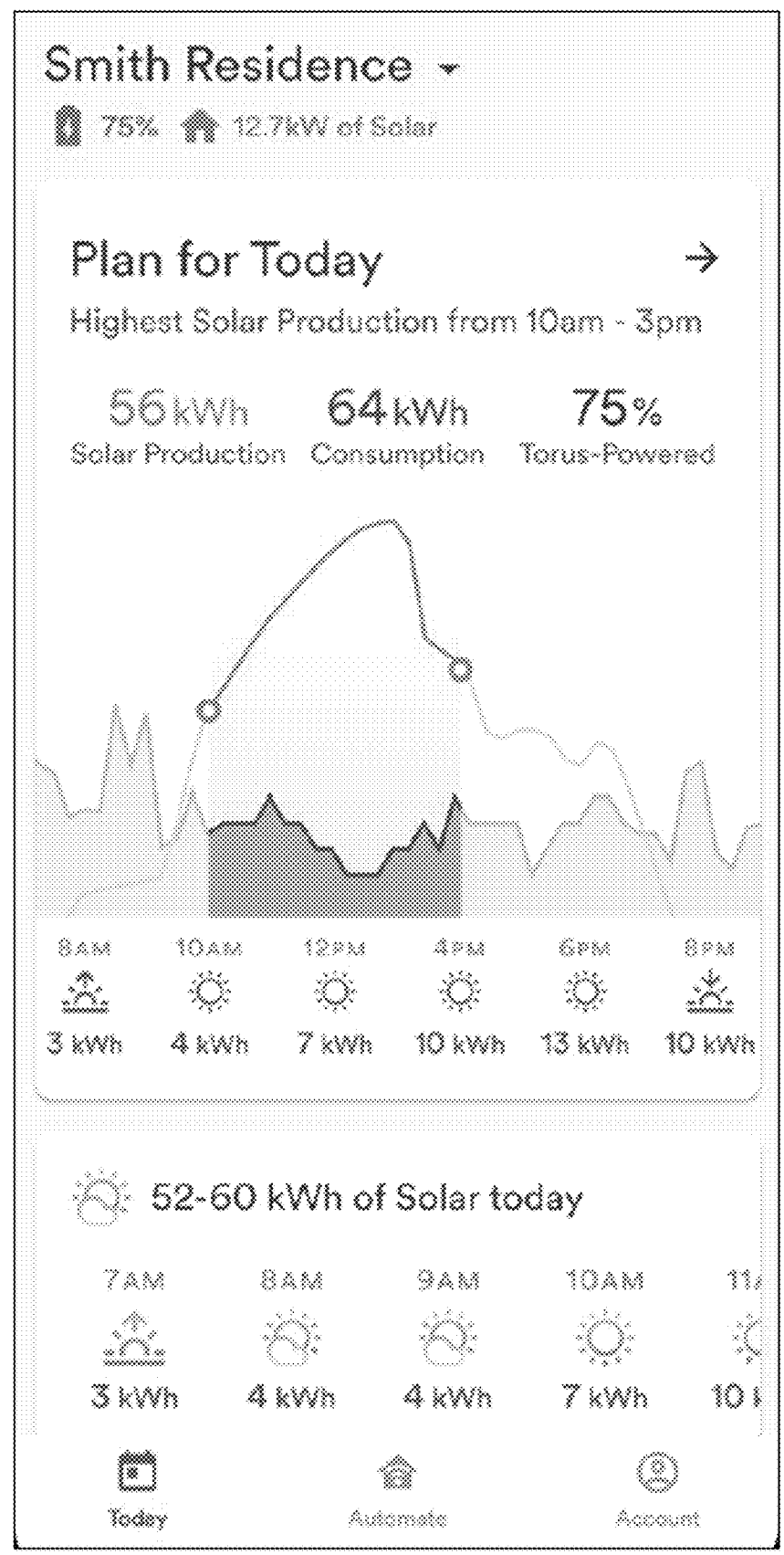

The example interface 500c in FIG. 5C illustrates a predicted solar production, consumption, and differential as a graph over time. In some instances, a portion of the graph may be selected to indicate total production, consumption, or differentials for that time period.

FIG. 5C shows predicted power production, power consumption, and predicted score for the day. The interface 500c may display a graph showing forecasted weather, power production, and use data. The interface 500c also provides the options for the user to define a power plan in which power loads are scheduled throughout the day. For instance, the system may recommend that an EV be charged when an ESU state of charge and/or solar production is highest and/or the user may manually define the schedule. In some instances, the system may instruct a smart device, such as an EV charger, refrigerator, or other device to conform to the schedule.

Figure 5D:
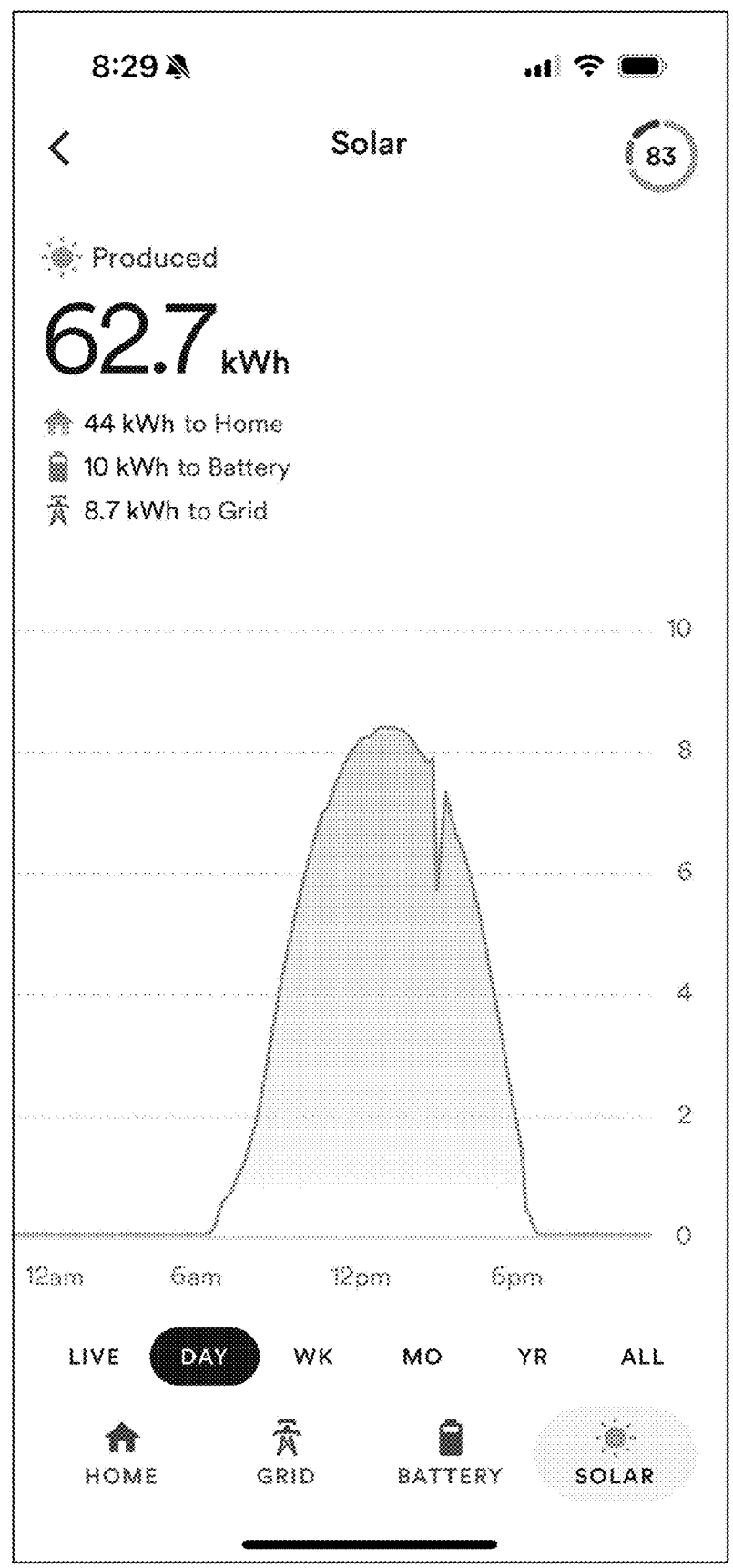
Figure 5E:
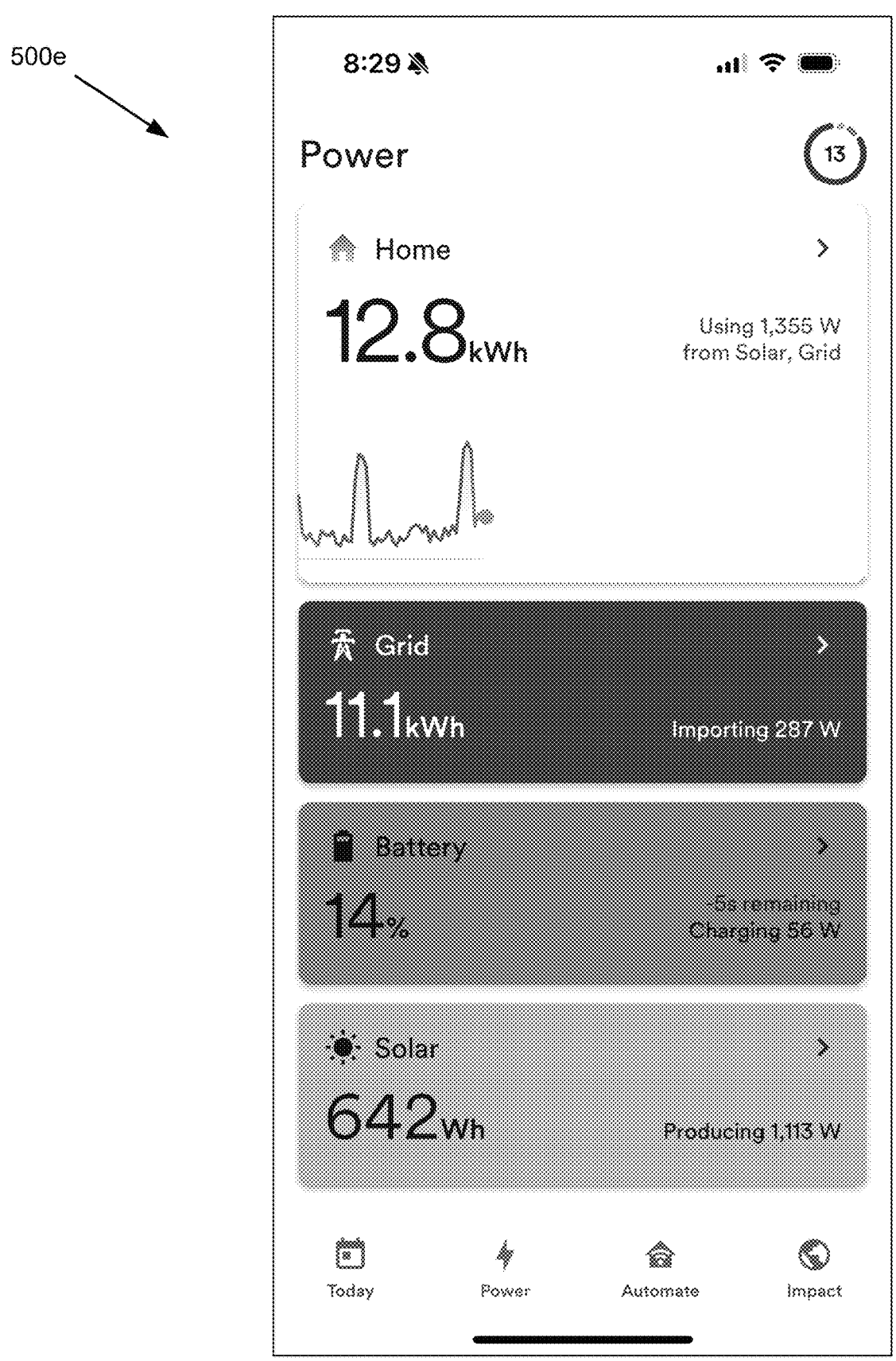

The example interface 500d in FIG. 5D illustrates an actual or predicted solar production, an amount stored in a battery, and/or an amount transferred to a grid. This data may be presented as text, a line graph, or a bar graph, for example, for various time periods. For instance, the example interface 500e in FIG. 5D illustrates textual data indicating a total, pending, or future current sent to or received from various sources. Colors, shades, or other details of the interface may be automatically updated to indicate comparison of the data with defined thresholds.

Figure 6:
FIG. 6 illustrates an example mobile graphical user interface showing node data.

FIG. 6 illustrates an example mobile graphical user interface 600 that may be generated by the technology described herein. For instance, the interface 600 indicates ESU modes that use weather and energy prediction data to automatically adjust and configure ESUs or nodes 140. The system may command and control hardware using the nodes 140, determine weather and energy forecasting data from AI algorithms, enable fleet virtual power plants to monitor multiple nodes 140 or ESUs, etc. Example modes may include self-consume, battery priority, storm watch, off-grid, away, grid share, grid stabilize, EV charging network, or otherwise. The modes may be set manually or automatically, as described above.

For instance, the example interface 600 illustrated in FIG. 6 illustrates an indication of a current mode of a node 140. As illustrated, a "storm watch" mode is being used during which a battery is being charged to 100 percent to prepare for a potential power outage. As described above, this mode may be automatically selected based on weather forecast data, a predicted power consumption, predicted power production, or other data. Another potential mode may be off-grid, where the system only uses power stored in a battery or locally produced and where the system automatically limits consumption by various devices, such as non-baseline loads.

For instance, an interface may indicate that a storm is predicted at the location of the node 140 and request authorization to enter storm watch mode. The system may automatically detect a power outage and transition into off-grid mode to use the power stored in the ESU. In some instances, a notification may be sent to a stakeholder, such as a customer or administrator, that the mode has changed.

FIG. 7 illustrates an example mobile graphical user interface 700 that may be generated by the technology described herein. For instance, the interface 700 may indicate a current mode of a node 140 (e.g., of an inverter of the node 140), such as self-consume, battery priority, storm watch, auto switch, EV charging, cloudy day, etc. Various modes or preferences may be input by the user via the interface 700 and/or automatically selected based on the consumption, production, or differential forecasts for the node 140, although other implementations are possible and contemplated herein.

Figure 8A:
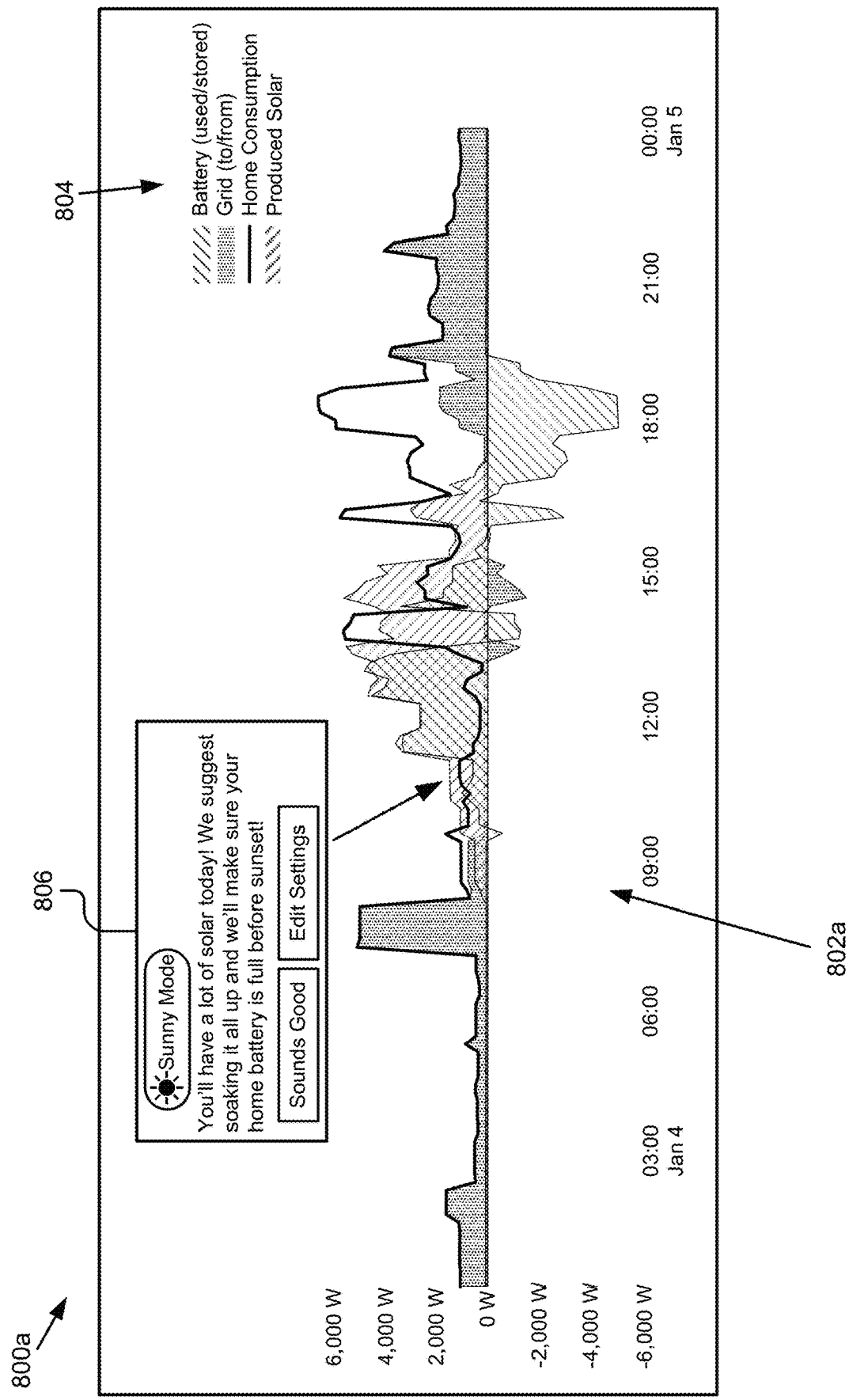
FIGS. 8A-8D illustrate graphical user interfaces representing power consumption, production, and storage for one or more nodes.
Figure 8B:
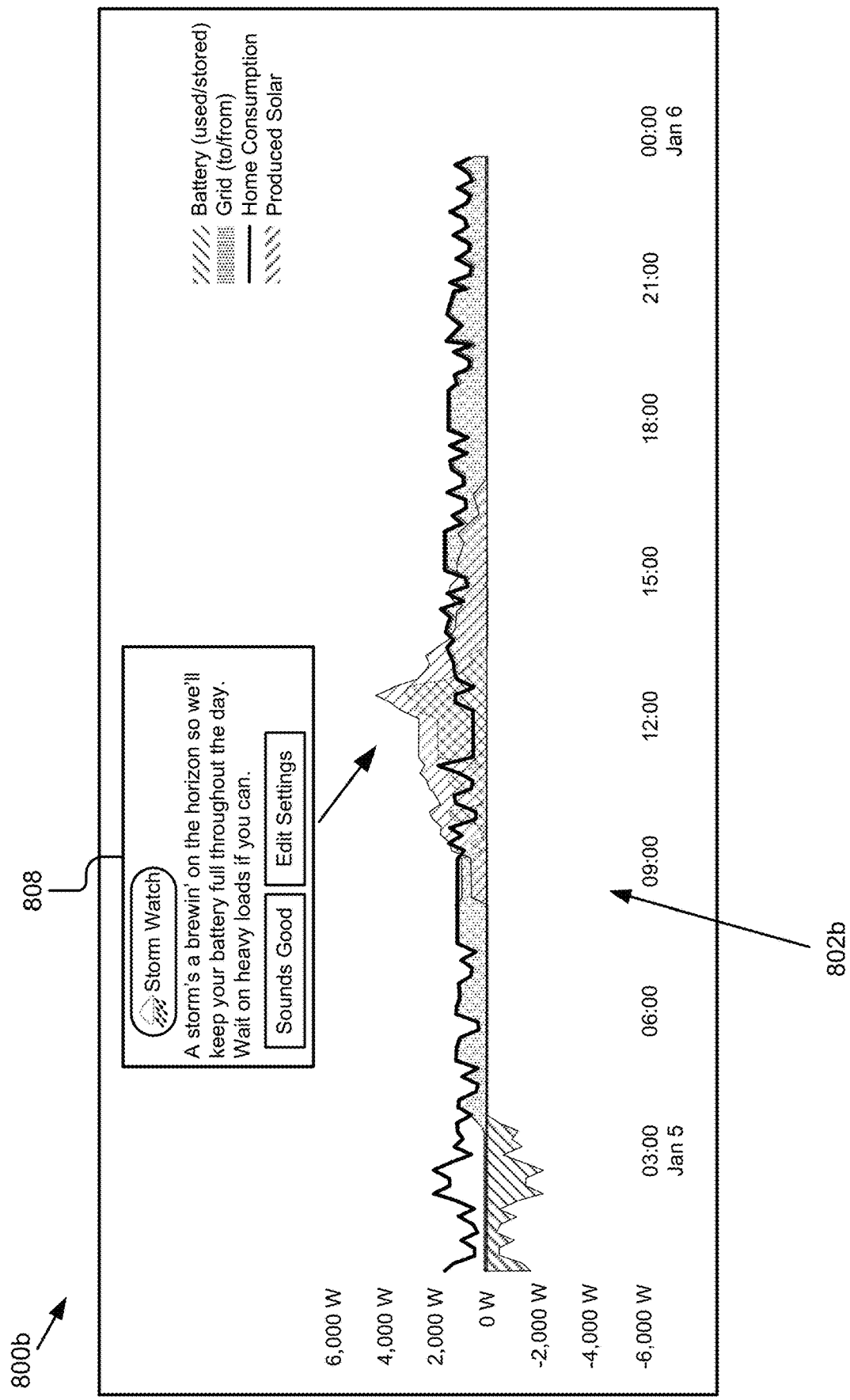
Figure 8C:
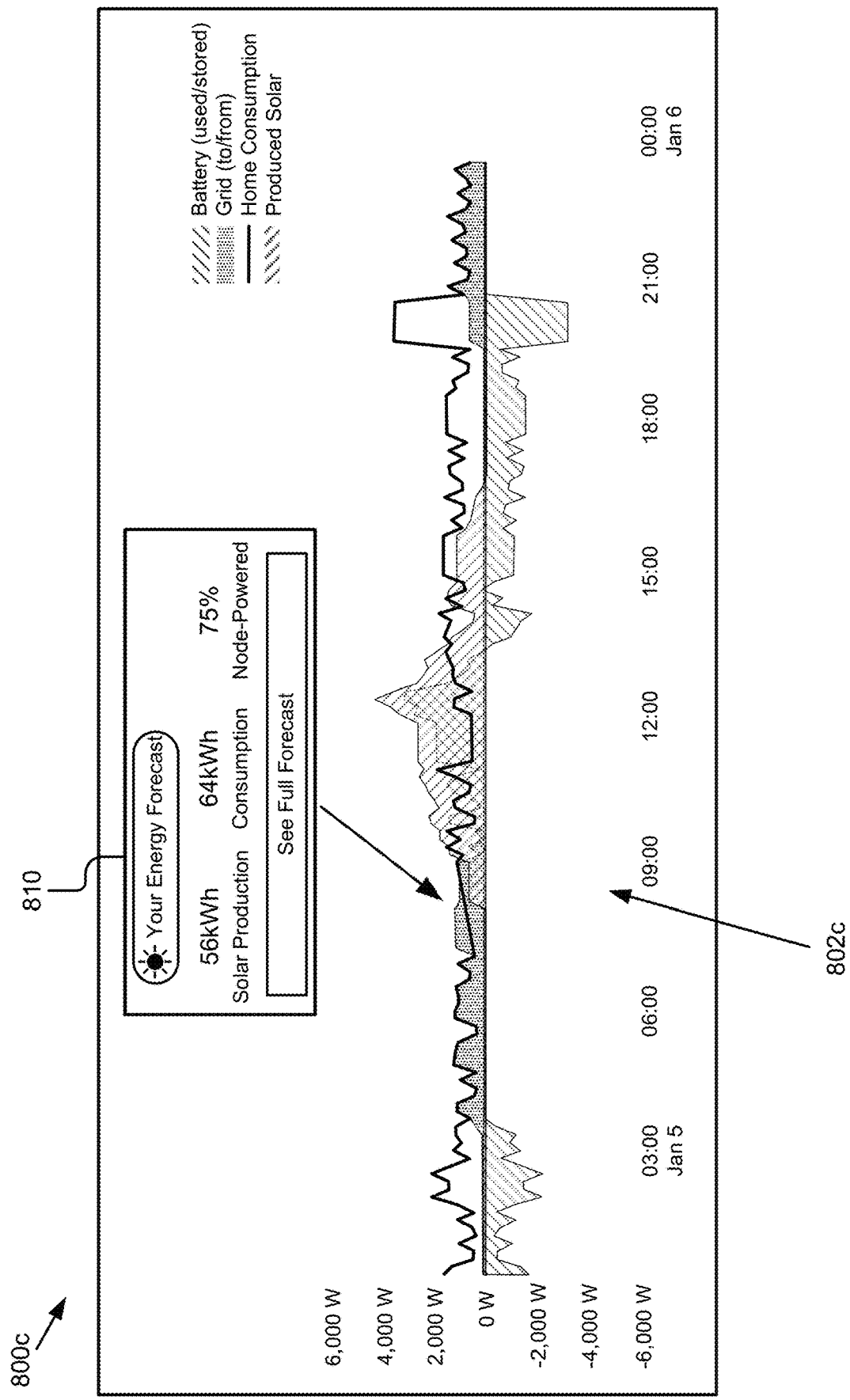
Figure 8D:
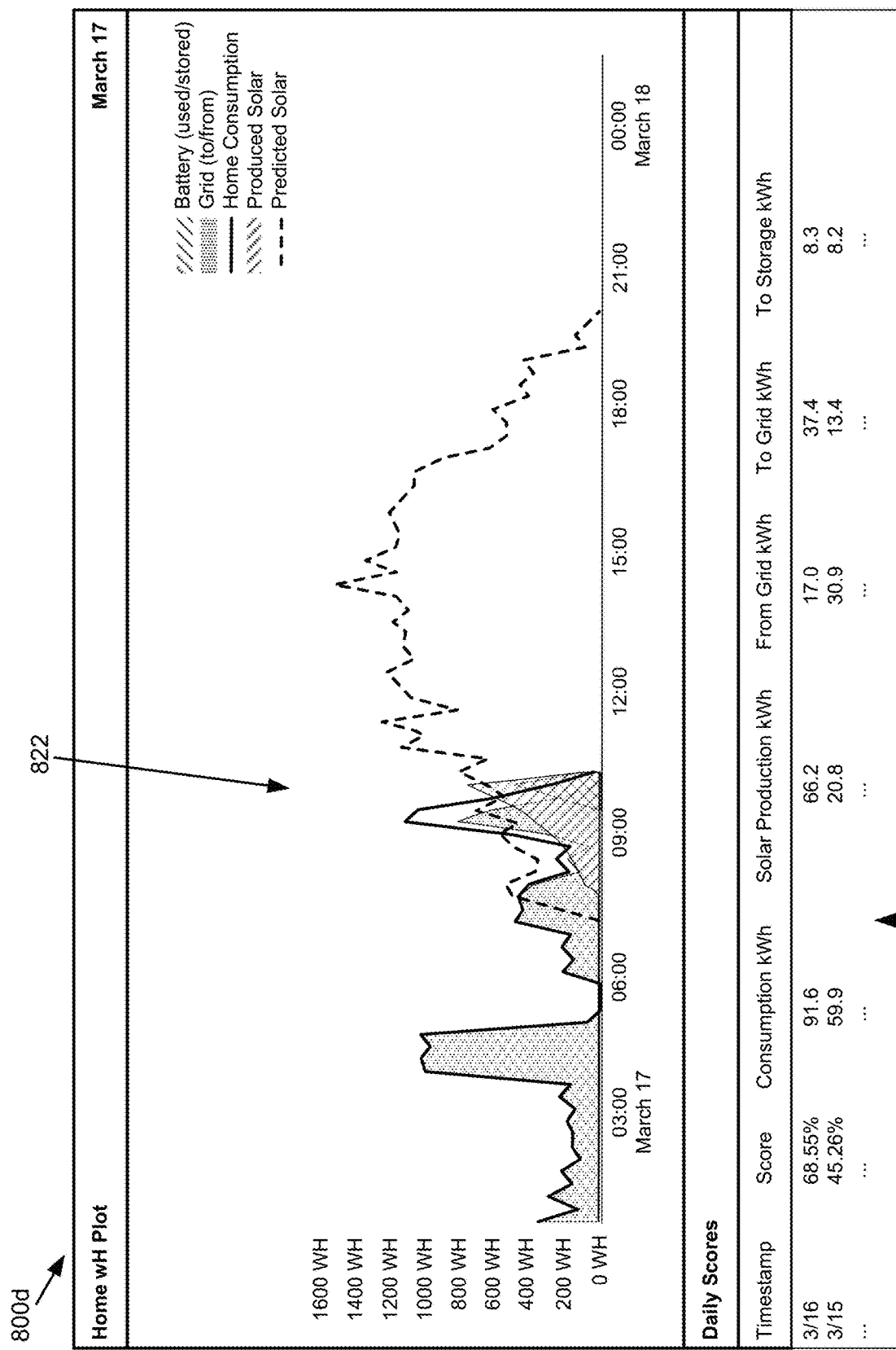
Figure 9:
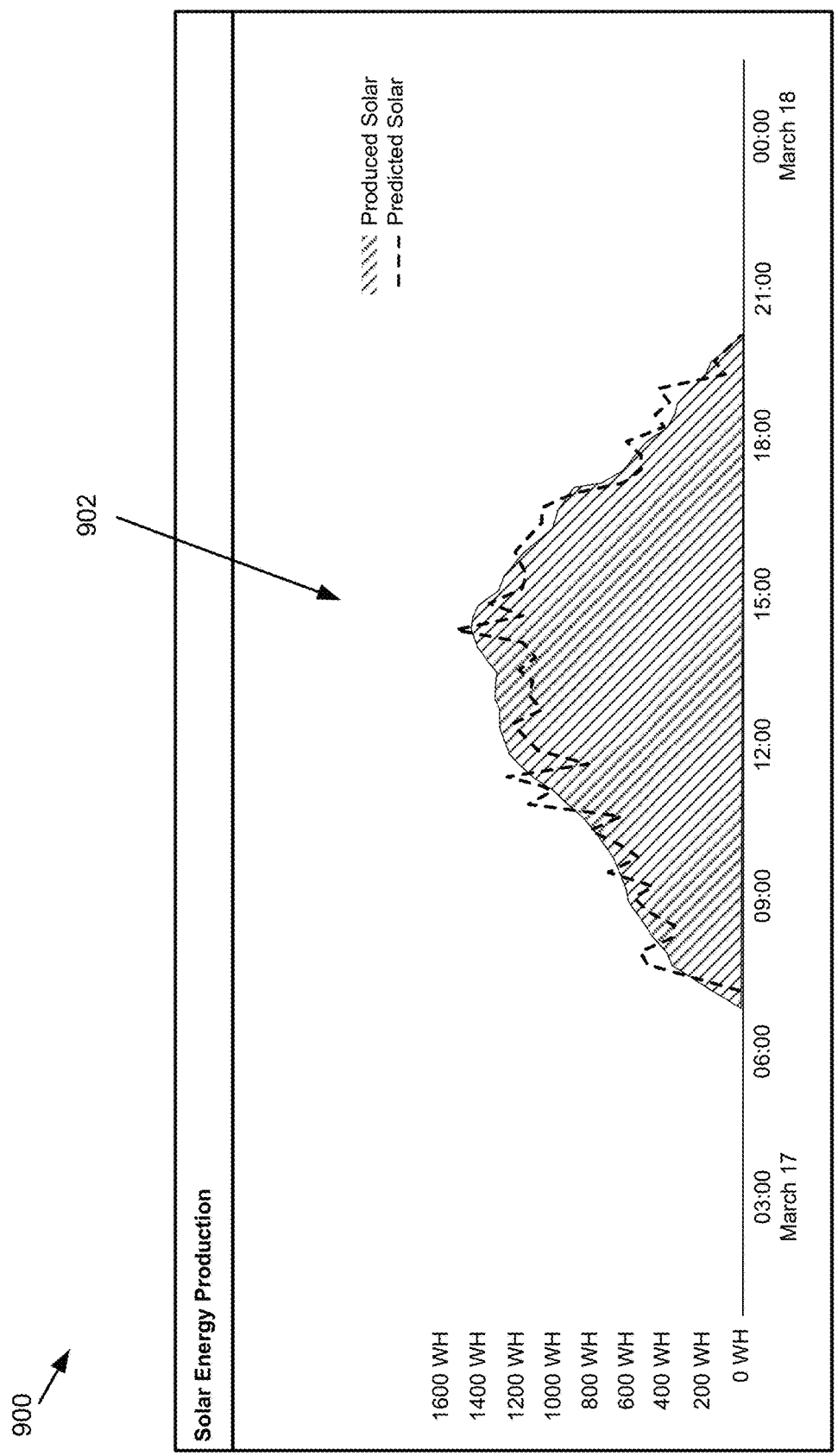
FIG. 9 illustrates a graphical user interface showing an example graph showing analytics comparing actual and predicted power production.

FIGS. 8A-9 illustrate graphical user interfaces that may be generated by the technology described herein to represent the current, past, or future performance of a node 140.

For instance, FIG. 8A depicts a graphical user interface 800a showing an example graph 802a indicating current and historical battery storage, grid usage, home consumption, and produced solar power over time, as indicated in the illustrated legend 804. The interface 800a may also indicate that the battery be charged up during the daytime. For instance, the interface 800a may display a popup window 806 or overlay indicating a current or predicted mode of a node 140 (e.g., sunny mode-charging from the sun). In some instances, the pop-up window 806 may allow a user to override the automatically determined node 140.

FIG. 8B depicts a graphical user interface 800b showing an example graph 802b showing similar data to the interface 800a, which may highlight that there is a storm in the forecast and recommends decreasing power consumption to ensure that the battery charge remains high. For instance, an overlay or popup window 808 may indicate that a storm is expected, and that the system will adjust its mode to prepare for the storm. In some cases, the system may determine and automatically time-shift non-baseline loads. In some cases, the interface 800b may provide general or specific recommendations to the user to time-shift loads (e.g., "Wait on heavy loads if you can.").

FIG. 8C depicts a graphical user interface 800c showing an example graph 802c showing similar data to the interface 800a, which may display other information in an overlay or popup window 810. For instance, the interface 800c shows forecasted solar production, energy consumption, and displays a score for how much energy is being used from local production (e.g., total energy used produced divided by energy consumed). The window 810 may indicate analytics of these values, which may be totaled for the displayed time period. For instance, the window 810 may display total solar production, total consumption, and score (e.g., percent of locally produced power used). Where some or all of the displayed data is forecasted data (e.g., in the future), the analytics and/or graphs may indicate or include forecasts (e.g., it is forecasted that a node 140 will use 75 percent locally produced power and 25 percent grid power).

FIG. 8D depicts a graphical user interface 800d showing an example graph 822 and table 824. The interface 800d may illustrate historical energy use, consumption, and production over time. The interface 800d also shows predicted solar production over time, but it may additionally or alternatively show energy/power differential, predicted and/or target battery state of charge, or other information.

The table 824 may also depict time stamped information for various time periods to show the score or precent locally produced energy used, consumption, solar production, power from the grid, power to the grid, and power to storage, although other data points are possible.

FIG. 9 depicts a graphical user interface 900 showing an example graph 902. The graph may illustrate an actual solar production for a node 140 overlayed with a predicted solar prediction, based on the operations described above. In some implementations, a difference between the actual and predicted curves may be computed to determine an accuracy of the prediction. In some instances, the difference and/or accuracy may be aggregated across multiple nodes 140 in order to evaluate prediction model accuracy.

In the foregoing description, for purposes of explanation, numerous specific details are set forth in order to provide a thorough understanding of the technology. It will be apparent, however, that the technology described herein can be practiced without these specific details.

Reference in the specification to "one implementation", "an implementation", "some implementations", or "other implementations" means that a particular feature, structure, or characteristic described in connection with the implementation is included in at least one implementation of the disclosure. The appearances of the term "implementation" or "implementations" in various places in the specification are not necessarily all referring to the same implementation.

In addition, it should be understood and appreciated that variations, combinations, and equivalents of the specific implementations, implementations, and examples may exist, are contemplated, and are encompassed hereby. The invention should therefore not be limited by the above-described implementations, implementations, and examples, but by all implementations, implementations, and examples, and other equivalents within the scope and spirit of the invention as claimed.

What is claimed is:

1. A computer-implemented method comprising:
   receiving, by one or more processors, a set of power consumption data points for one or more nodes, the one or more nodes including one or more meters for determining at least one data point of the set of power consumption data points, each of the one or more nodes including an energy storage unit, the energy storage unit including one or more of a mechanical battery and a chemical battery;
   determining, by the one or more processors, a first subset and a second subset of the set of power consumption data points for the one or more nodes, the first subset corresponding to data points from one or more devices classified as controllable, the second subset corresponding to one or more devices classified as not controllable and indicating a baseline power consumption for the one or more nodes, the second subset of the set of power consumption data points omitting data points from one or more controllable loads from which the set of power consumption data points is determined;
   training, by the one or more processors, a first machine learning model to predict a future power consumption using the baseline power consumption for the one or more nodes;
   receiving, by the one or more processors, context data for the one or more nodes, the context data including local weather data and weather forecast data for the one or more nodes;
   receiving, by the one or more processors, local power production data for the one or more nodes, the local power production data being determined for one or more solar panels electrically coupled with the energy storage unit;
   training, by the one or more processors, a second machine learning model using the local power production data and the local weather data;
   computing, by the one or more processors, a predicted power differential at a future time for the one or more nodes based on the weather forecast data, the first machine learning model, and the second machine learning model;
   controlling, by the one or more processors, a mode of the one or more nodes based on the predicted power differential at the future time, the mode defining whether the one or more nodes perform one or more of receiving, storing, or outputting electrical power; and
   directing, by the one or more processors, power consumption of the one or more controllable loads of the one or more nodes based on the predicted power differential at the future time.

2. A computer-implemented method comprising:
   receiving, by one or more processors, a set of power consumption data points for a node;
   determining, by the one or more processors, a first subset and a second subset of the set of power consumption data points for the node, the first subset corresponding to data points from one or more devices classified as controllable, the second subset corresponding to one or more devices classified as not controllable and indicating a baseline power consumption for the node;

determining, by the one or more processors, a consumption model for the node using the baseline power consumption for the node, the consumption model predicting a future power consumption for the node;

receiving, by the one or more processors, context data for the node, the context data including weather forecast data for the node;

determining, by the one or more processors, a production model for the node, the production model predicting a future power production of the node using the weather forecast data for the node;

computing, by the one or more processors, a predicted power differential at a future time for the node based on the predicted power consumption, the predicted power production, and the context data for the node; and performing, by the one or more processors, one or more automated operations using the predicted power differential and based on the baseline power consumption for the node, the one or more automated operations including transmitting a control instruction for at least one of the one or more devices classified as controllable.

3. The computer-implemented method of claim 2, wherein:
the consumption model for the node includes a first machine learning model trained on power consumption data of one or more loads electrically coupled with an energy storage unit of the node.

4. The computer-implemented method of claim 2, further comprising:
receiving, by the one or more processors, the set of power consumption data points for the node, the node including one or more meters for determining at least one data point of the set of power consumption data points;
determining, by the one or more processors, the baseline power consumption for the node using the second subset of the set of power consumption data points; and
training, by the one or more processors, a first machine learning model to predict the future power consumption based on the second subset of the set of power consumption data points.

5. The computer-implemented method of claim 4, wherein:
the second subset of the set of power consumption data points omits data points from one or more controllable loads from which the set of power consumption data points is determined.

6. The computer-implemented method of claim 2, wherein:
the context data includes local weather data received from a local power station to the node, the local weather data informing one or more of the consumption model and the production model for the node.

7. The computer-implemented method of claim 6, further comprising:
receiving, by the one or more processors, local power production data for the node; and
training, by the one or more processors, a second machine learning model using the local power production data and the local weather data, the production model including the second machine learning model.

8. The computer-implemented method of claim 2, wherein:
the production model includes a second machine learning model trained using power production and context data for one or more second nodes, the one or more second nodes having one or more attributes in common with the node.

9. The computer-implemented method of claim 2, further comprising:
aggregating, by the one or more processors, predicted power differentials for a plurality of nodes, the predicted power differentials including the computed power differential for the node;
generating, by the one or more processors, one or more analytics based on the predicted power differentials for the plurality of nodes; and
providing, by the one or more processors, one or more graphical user interfaces graphically showing the one or more analytics.

10. The computer-implemented method of claim 2, wherein performing the one or more automated operations using the predicted power differential includes:
controlling, by the one or more processors, a mode of the node based on the predicted power differential at the future time, the mode defining whether the node performs one or more of receiving, storing, or outputting electrical power.

11. The computer-implemented method of claim 2, wherein performing the one or more automated operations using the predicted power differential includes:
directing, by the one or more processors, power consumption of one or more controllable loads of the node based on the predicted power differential.

12. A system comprising:
an energy-storage unit including:
a battery storing energy mechanically or chemically;
an inverter coupled with the battery and converting direct current from the battery to alternating current; and
a controller communicatively coupled with the inverter, the controller controlling one or more functions of the battery; and
one or more processors executing instructions that cause the one or more processors to perform operations comprising:
receiving a set of power consumption data points for a node;
determining a first subset and a second subset of the set of power consumption data points for the node, the first subset corresponding to data points from one or more devices classified as controllable, the second subset corresponding to one or more devices classified as not controllable and indicating a baseline power consumption for the node;
determining a consumption model for the node using the baseline power consumption for the node, the consumption model predicting a future power consumption for the node;
receiving context data for the node, the context data including weather forecast data for the node;
determining a production model for the node, the production model predicting a future power production of the node using the weather forecast data for the node;
computing a predicted power differential at a future time for the node based on the predicted power consumption, the predicted power production, and the context data for the node; and
performing one or more automated operations using the predicted power differential and based on the baseline power consumption for the node, the one or more automated operations including transmitting a control instruction for at least one of the one or more devices classified as controllable.

13. The system of claim 12, wherein:
the consumption model for the node includes a first machine learning model trained on power consumption data of one or more loads electrically coupled with an energy storage unit of the node.

14. The system of claim 12, wherein the operations further comprise:
receiving the set of power consumption data points for the node, the node including one or more meters for determining at least one data point of the set of power consumption data points;
determining the baseline power consumption for the node using the second subset of the set of power consumption data points; and
training a first machine learning model to predict the future power consumption based on the second subset of the set of power consumption data points.

15. The system of claim 14, wherein:
the second subset of the set of power consumption data points omits data points from one or more controllable loads from which the set of power consumption data points are determined.

16. The system of claim 12, wherein:
the context data includes local weather data received from a local power station to the node, the local weather data informing one or more of the consumption model and the production model for the node.

17. The system of claim 16, wherein the operations further comprise:
receiving local power production data for the node; and
training a second machine learning model using the local power production data and the local weather data, the production model including the second machine learning model.

18. The system of claim 12, wherein the operations further comprise:
aggregating predicted power differentials for a plurality of nodes, the predicted power differentials including the computed power differential for the node;
generating one or more analytics based on the predicted power differentials for the plurality of nodes; and
providing one or more graphical user interfaces graphically showing the one or more analytics.

19. The system of claim 12, wherein performing the one or more automated operations using the predicted power differential includes:
controlling a mode of the node based on the predicted power differential at the future time, the mode defining whether the node performs one or more of receiving, storing, or outputting electrical power.

20. The system of claim 12, wherein performing the one or more automated operations using the predicted power differential includes:
directing power consumption of one or more controllable loads of the node based on the predicted power differential.

* * * * *